(12) United States Patent
Fellegara et al.

(10) Patent No.: US 6,441,854 B2
(45) Date of Patent: *Aug. 27, 2002

(54) ELECTRONIC CAMERA WITH QUICK REVIEW OF LAST CAPTURED IMAGE

(75) Inventors: Peter Fellegara, Fairport, NY (US); Richard W. Lourette, Fairport, NY (US); Michael E. Miller, Rochester, NY (US); Linda M. Antos, Rochester, NY (US); Robert H. Hibbard, Fairport, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/803,342

(22) Filed: Feb. 20, 1997

(51) Int. Cl.[7] ............................................. H04N 5/222
(52) U.S. Cl. ........................... 348/333.13; 348/333.01; 348/231; 348/372
(58) Field of Search .......................... 348/64, 231, 233, 348/333, 334, 207, 220, 372, 333.01, 333.13; 358/909.1, 906; 396/429

(56) References Cited

U.S. PATENT DOCUMENTS

| 4,751,583 | A | * | 6/1988 | Levine ........................ 358/403 |
| 4,887,161 | A | | 12/1989 | Watanabe et al. |
| 5,412,425 | A | * | 5/1995 | Nagano ........................ 348/372 |
| 5,473,370 | A | * | 12/1995 | Moronaga et al. ........... 348/231 |
| 5,541,656 | A | * | 7/1996 | Kare et al. ................... 348/334 |
| 5,576,759 | A | * | 11/1996 | Kawamura et al. ......... 348/231 |
| 5,742,339 | A | * | 4/1998 | Wakui .......................... 348/233 |
| 5,767,904 | A | * | 6/1998 | Miyake ........................ 348/362 |
| 5,774,754 | A | * | 6/1998 | Ootsuka ....................... 396/380 |
| 5,812,736 | A | * | 9/1998 | Anderson ..................... 366/96 |
| 5,875,120 | A | * | 2/1999 | Matsushima et al. ........ 364/707 |
| 5,929,951 | A | * | 7/1999 | Sasakura et al. .............. 349/62 |

FOREIGN PATENT DOCUMENTS

EP  0 356 351 A  2/1990

* cited by examiner

Primary Examiner—Wendy R. Garber
Assistant Examiner—Mitchell White
(74) Attorney, Agent, or Firm—David A. Novais

(57) ABSTRACT

A camera incorporates a working memory (124) for storing a working image corresponding to the last captured image. The working image is displayed on a display screen (36) in a quick review mode of operation in response to a quick review signal entered by the camera operator via a camera control interface (74) to control processing circuitry (68,72) of the camera. The processing circuitry controls the display screen to keep it in an inactive state until the quick review signal is entered, and returns it to an inactive state after a predetermined time period or when the quick review signal is discontinued to conserve energy. In addition, the working image is displayed in the quick review mode regardless of whether a non-volatile memory is available in the camera or, in the case of a hybrid camera, whether a film cartridge is contained in a film chamber (98) of the camera.

21 Claims, 13 Drawing Sheets

ELECTRONIC CAMERA WITH QUICK REVIEW OF LAST CAPTURED IMAGE

FIELD OF THE INVENTION

The invention relates in general to cameras that generate digital images for storage on a removable storage medium. More specifically, the invention relates to a camera that includes a working memory that stores a working image which is updated for each subsequent exposure operation, wherein the working image can be displayed in a quick review mode on a display screen regardless of whether the removable storage medium is attached to the camera. The invention is particularly directed to a hybrid camera that includes both a digital imaging system and a silver-halide imaging system, wherein a working image can be displayed in the quick review mode regardless of whether the removable storage medium is attached to the camera or a film cartridge is loaded in the camera.

BACKGROUND OF THE INVENTION

There have been a number of conventional electronic still cameras and hybrid cameras either proposed and/or commercially developed. In each of the conventional cameras, electronic images are generally captured and stored on a recording medium that can be removed from the camera or transmitted by a data link to a remote location. Early electronic and hybrid cameras, for example, utilized magnetic recording disks as an image storage medium, while more recent developments in electronics have led to the use of semiconductor device memory cards. It is desirable to include a display screen on the camera to permit images captured and stored on the memory cards to be reviewed. U.S. Pat. No. 4,742,369 issued to Ishii et al., for example, describes a camera that includes a display device so that an operator can confirm whether the captured image is acceptable. Image display devices large enough to display a digital image of acceptable size, such as a large array liquid crystal device, still consume a relatively large amount of power when active. Accordingly, the batteries of the camera can be quickly drained if the display device is utilized during imaging operations. Further, it would be desirable to be able to review the last captured image regardless of whether the removable memory medium was attached to the camera.

In view of the above, it is an object of the invention to provide a camera that incorporates an apparatus for allowing the camera operator to review a last captured image without causing a large energy drain. It is a further object to provide a camera in which the last captured image can be reviewed regardless of whether a removable memory medium is attached to the camera.

SUMMARY OF THE INVENTION

The invention provides a camera that incorporates a working memory for storing a working image corresponding to the last captured image. The working image is displayed on a display screen in a quick review mode of operation in response to a quick review signal entered by the camera operator. The display screen is kept in an inactive state until the quick review signal is entered, and returns to an inactive state after a predetermined time period or when the quick review signal is discontinued thereby conserving energy. In addition, the working image is displayed in the quick review mode regardless of whether a removable memory medium is attached to the camera or, in the case of a hybrid camera, whether a film cartridge is contained in the camera.

Specifically, a camera in accordance with the invention may include digital imaging means for generating a digital image representative of a subject scene; fixed working memory means for receiving and storing the digital image generated by the digital imaging means as a working image; a non-volatile memory for storing digital images; a display screen; and control processing means for controlling the operation of the digital imaging means, the fixed working memory means and the display screen. In accordance with the invention, the control processing means generates a digital mode image from the working image stored in the working memory and transfers the digital mode image to the non-volatile memory while retaining the working image in the working memory. The control processing means also selectively generates a display image from a digital mode image stored in the non-volatile memory and transfers the display image to the display screen for display. Finally, the control processing means selectively generates a quick review image from the working image stored in the working memory and supplies the quick review image to the display screen for display without requiring availability of the non-volatile memory.

The-digital imaging means may generate a plurality of digital images under control of the control processing means; so that, each subsequent one of the plurality of digital images replaces a preceding one of the plurality of digital images as the working image stored in the working memory, whereby the working image is representative of the last subject scene imaged by the camera. A hybrid version of the camera may include a photographic imaging means for imaging the subject scene onto a photographic film plane of the camera under control of the control processing means. The control processing means may include a camera operator interface that includes an image mode selector for selecting one of a film imaging mode, a hybrid imaging mode and the digital imaging mode of operation. The photographic imaging means may image the subject scene onto the photographic image plane in the film imaging mode and the hybrid imaging mode to generate a corresponding photographic film image on a photographic film located at the photographic imaging plane that corresponds with the digital image generated by the digital imaging means. The control processing means may generate a film mode digital image from the working image in the film imaging mode of operation and stores the film mode digital image in an internal fixed base camera memory of the camera, and wherein the control processing means selectively generates a display image from the film mode digital image and transfers the display image to the display screen for display.

The camera may include a removable interface connection means for receiving a removable memory device; wherein the non-volatile memory is comprised in a removable memory, such as a card coupled to the interface connection means. The control processing means may generate a hybrid mode digital image from the working image in the hybrid mode of operation and transfer the hybrid mode digital image to the removable memory interface connection means for storage on the memory card. The control processing means may selectively generate a display image from a hybrid mode digital image stored on the memory card coupled to the memory interface connection means and transfers the display image to the display screen for display.

The control processing means may activate the display screen for a predetermined time period to display the quick review image. The camera operator interface may include a quick review switch; so that, the control processing means activates the display screen to display the quick review image as long as the quick review switch is activated. Means may be included for storing the quick review image in the non-volatile memory or in removable memory.

BRIEF DESCRIPTION OF THE DRAWINGS

The invention will be described in greater detail below with reference to the accompanying figures, wherein.

DETAILED DESCRIPTION OF THE INVENTION

Figure 1:
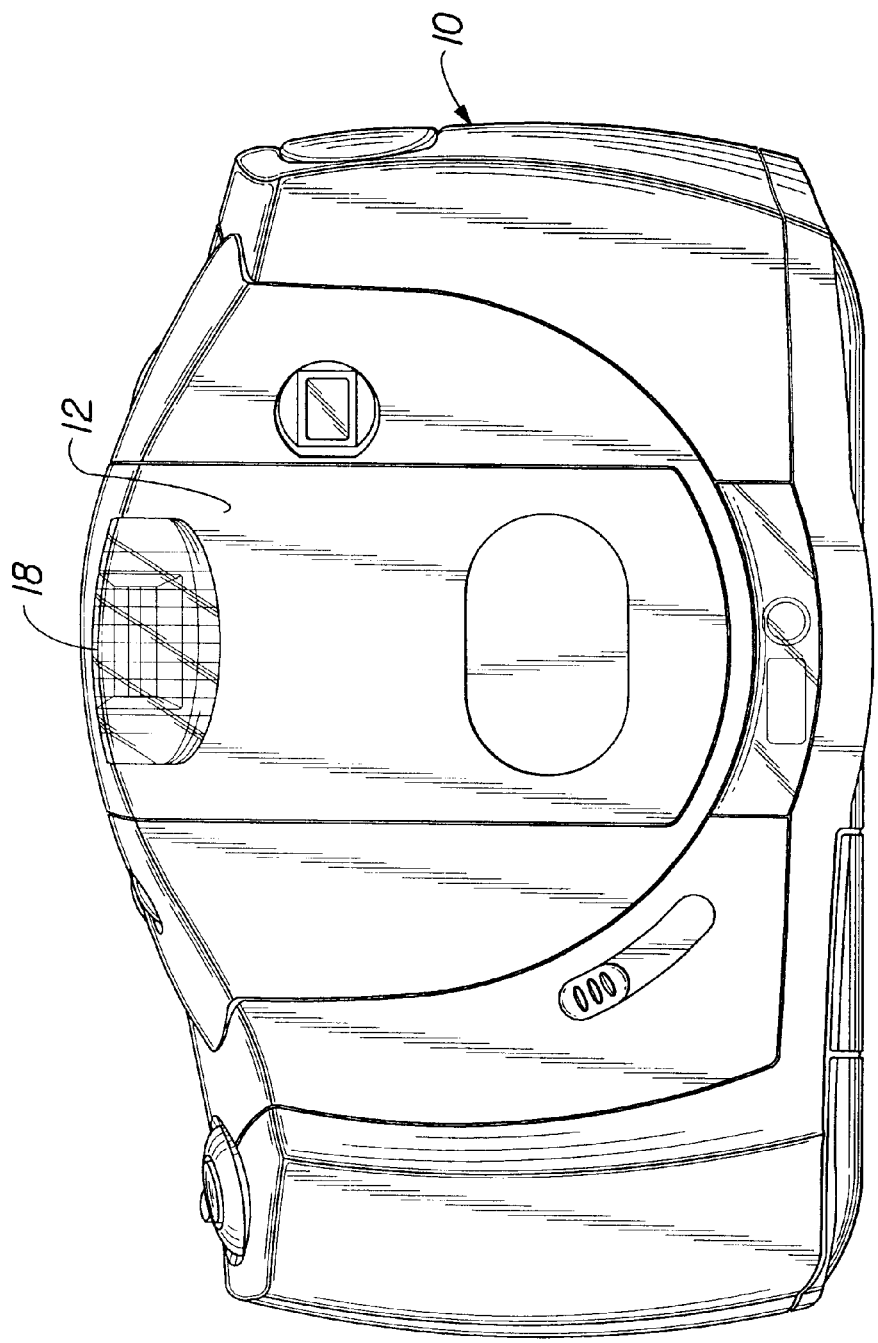
FIG. 1 is a front view of a camera in accordance with the present invention illustrated with a lens cover in a closed position.
Figure 2:
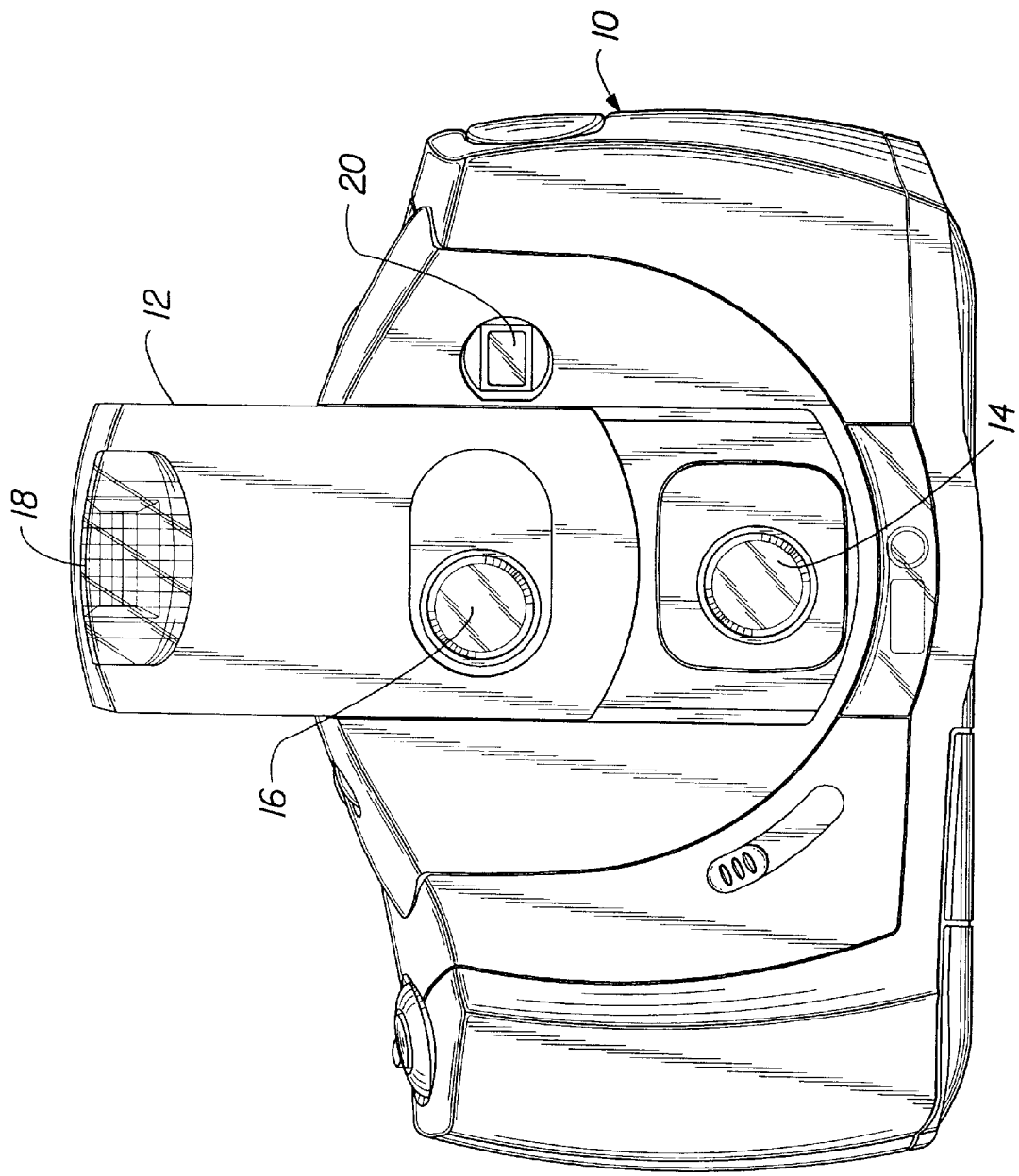
FIG. 2 is a front view of the camera of FIG. 1 with the lens cover illustrated in an extended position.

A hybrid camera in accordance with the invention is shown in FIG. 1 as including a main camera body 10 on which a sliding lens cover 12 is attached. A silver-halide optical system 14 and a digital imaging optical system 16 are located behind the sliding lens cover 12, and are both exposed to scene light when the sliding lens cover 12 is extended as illustrated in FIG. 2. An electronic flash unit 18 is preferably located on a top edge of the sliding lens cover 12, such that the extension of the lens cover 12 places the electronic flash unit 18 in a position sufficiently distant from the silver-halide optical system 14 and the digital imaging optical system 16 to prevent the occurrence of "red eye" in photographic and digital images captured by the camera. In the illustrated embodiment, a separate optical viewfinder 20 is provided adjacent to the lens cover 12, although it will be understood that viewfinders incorporated within or utilizing elements of either the silver-halide optical system 14 and/or the digital imaging optical system 16 may be readily employed. The optical viewfinder 20 includes a masking device, for example a segmented LCD or mechanical mask, that is used to match the image viewed by a camera operator through the viewfinder 20 to a corresponding image format selected by the camera operator. In a preferred embodiment, the optical viewfinder 20 provides several different aspect ratios including: a full VGA aspect ratio corresponding to an aspect ratio, such as 4:3, of the digital imaging optical system 16; an HDTV aspect ratio corresponding to the aspect ratio, such as 7:4, of the silver-halide optical system 14; a classic film aspect ratio, such as 10:7; and a panoramic aspect ratio, such as 20:7. The HDTV, classic and panoramic aspect ratios are the same as those used for the Advanced Photo System (APS) cameras introduced in 1996.

Figure 3:
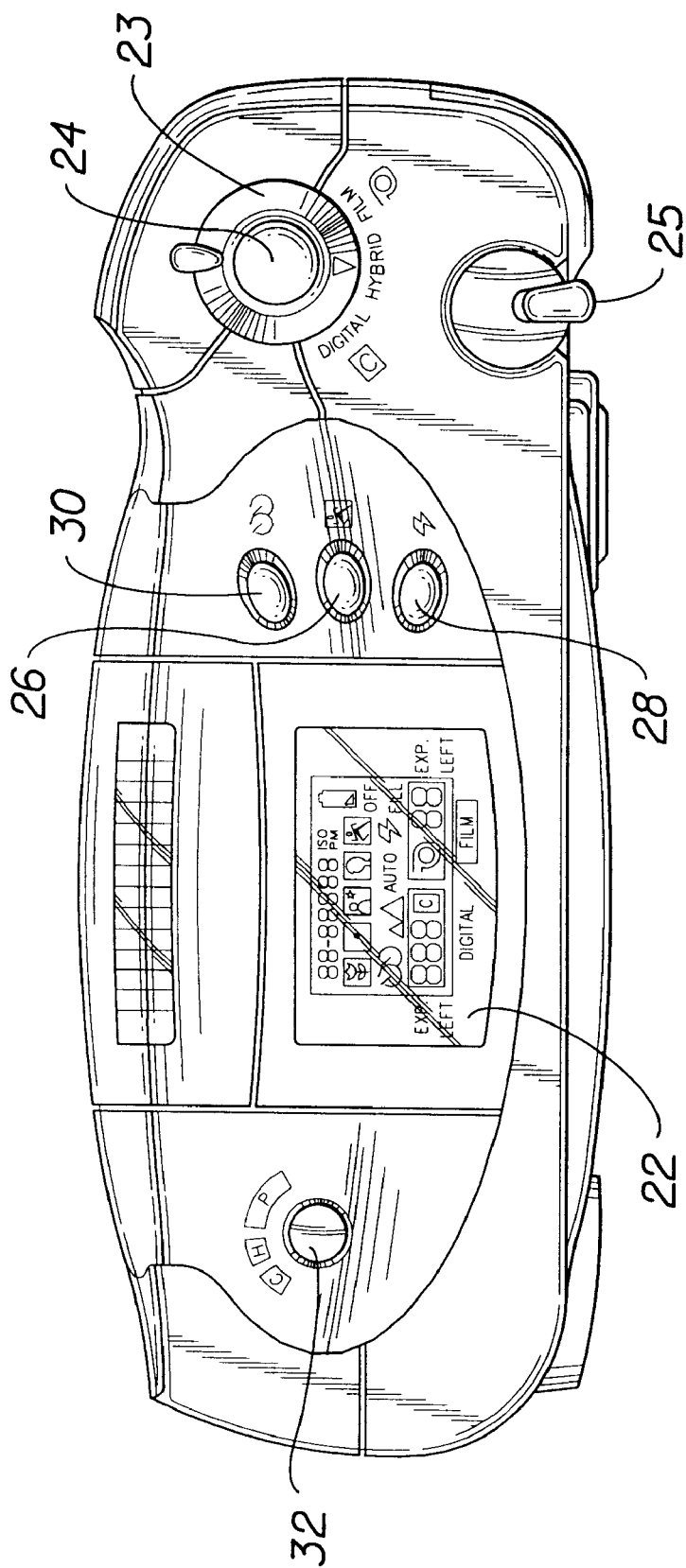
FIG. 3 is a top view of the camera illustrated in FIG. 1.
Figure 4:
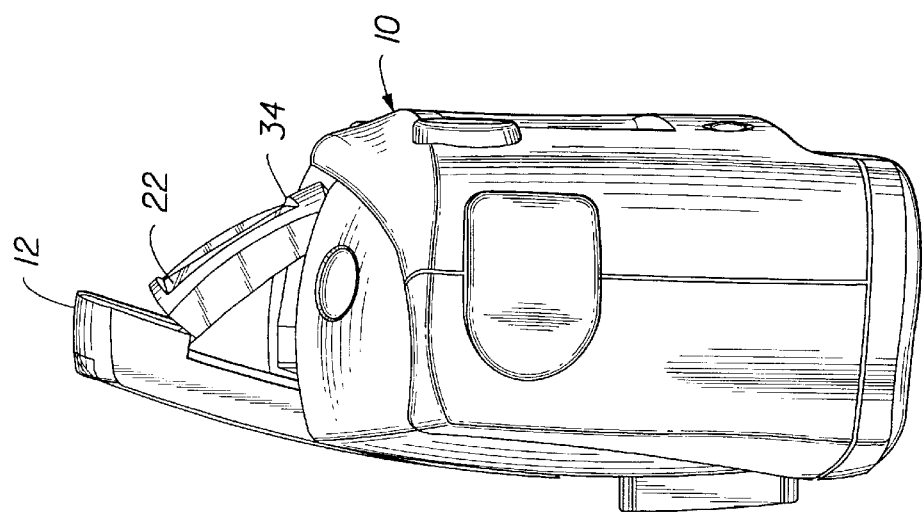
FIG. 4 is a side view of the camera illustrated in FIG. 2 with the lens cover in the extended position.

A top view of the camera body 10 is illustrated in FIG. 3. A liquid crystal display (LCD) status unit 22 is provided on the top of the main camera body 10 to display various camera status data to the camera operator. The LCD status unit 22 is roughly partitioned into three areas: an area for displaying information specific to film images; an area for displaying information specific to digital images; and a general information area that displays information related to both film images and digital images. In addition to the status unit 22, various operator controls are provided on the top of the camera body 10 including an image capture mode selector switch 23, a shutter button 24, a zoom control switch 25, a picture taking mode selector switch 26, a flash mode selector switch 28, a timer mode selector switch 30, and an image format selector switch 32. As illustrated, image capture mode switch 23 allows for settings of Digital, Hybrid or Film. However, those skilled in the art will appreciate that many features of the invention would be applicable in cameras where only Digital and Hybrid modes are provided, or only Digital and Film, or only Hybrid and Film, or only Hybrid. The LCD status unit 22 is preferably mounted on a hinged support element 34 that is coupled to the lens cover 12, such that the LCD status unit 22 is tilted toward the camera operator when the lens cover 12 is extended during an image capture operation as shown in FIG. 4.

Figure 5:
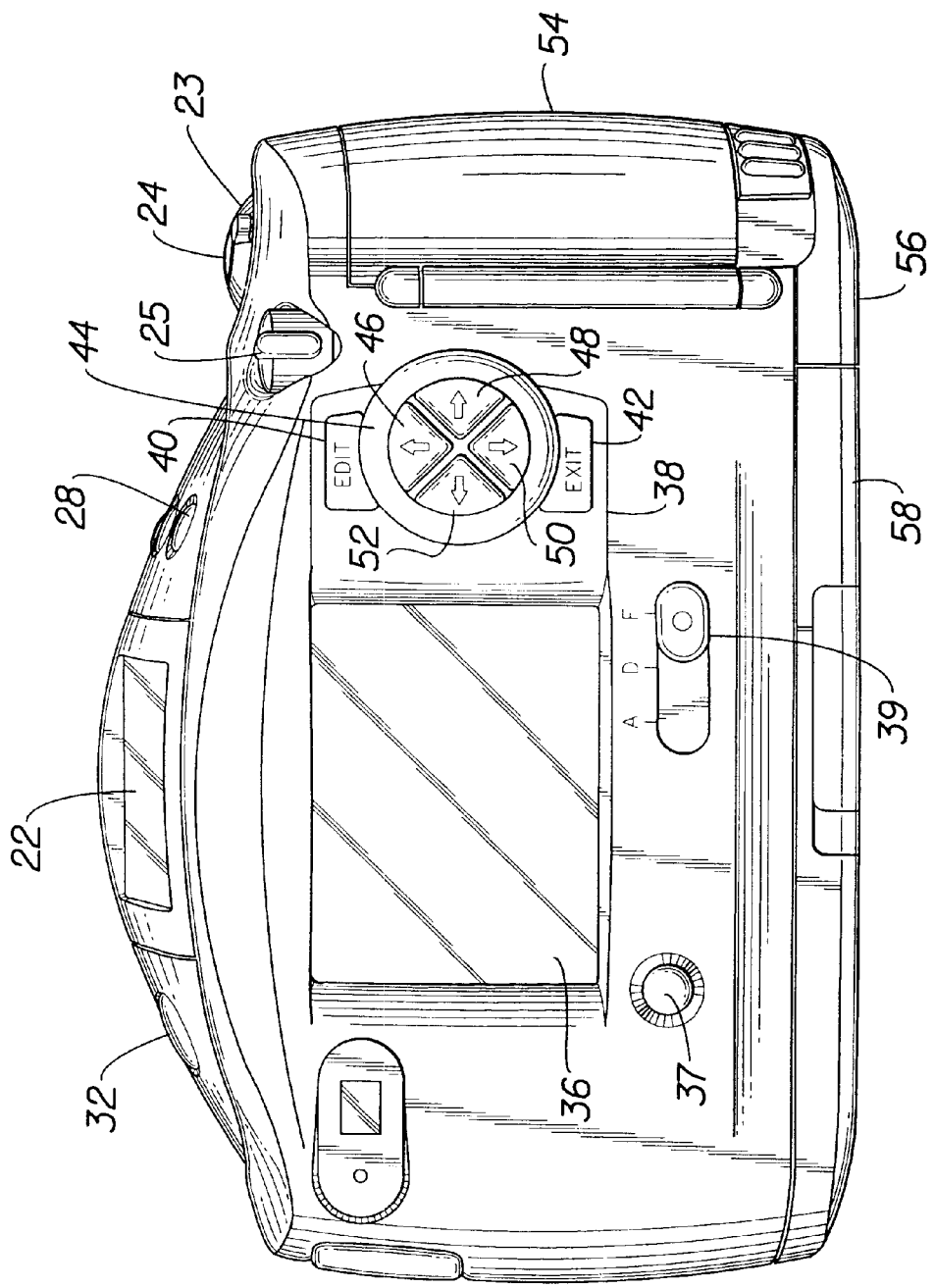
FIG. 5 is a back view of the camera illustrated in FIG. 1 with the lens cover in the closed position.

A color main screen display unit 36 is provided on the back of the main camera body 10, as illustrated in FIG. 5, and is preferably recessed from the back surface of the main camera body 10 for protection. A main screen operator control unit 38 is provided adjacent to the main screen display unit 36 and includes an edit switch 40, an exit switch 42 and a directional switch unit 44. The directional switch unit 44 is preferably a four directional thumb pad segmented into four different individual directional switches including an up directional switch 46, a down directional switch 50, a right directional switch 48 and a left directional switch 52. It will be understood, however, that other types of directional switch units, for example track balls, pressure pads, etc., may be readily employed to enter directional signals. The main screen operator control unit 38 is utilized in conjunction with elements of graphical user interfaces displayed on the main screen display unit 36 to control various camera functions that will be described in greater detail below.

The main camera body 10 is also provided with a memory card door 54, a battery compartment door 56 and a film chamber door 58 as illustrated in FIG. 5. The memory card door 54 is provided to protect a memory card interface connector located in the main camera body 10. The battery compartment door 56 and film chamber door 58 are provided in the bottom of the main camera body 10 in a conventional manner to provide access to an internal film chamber and a battery compartment.

Figure 6:
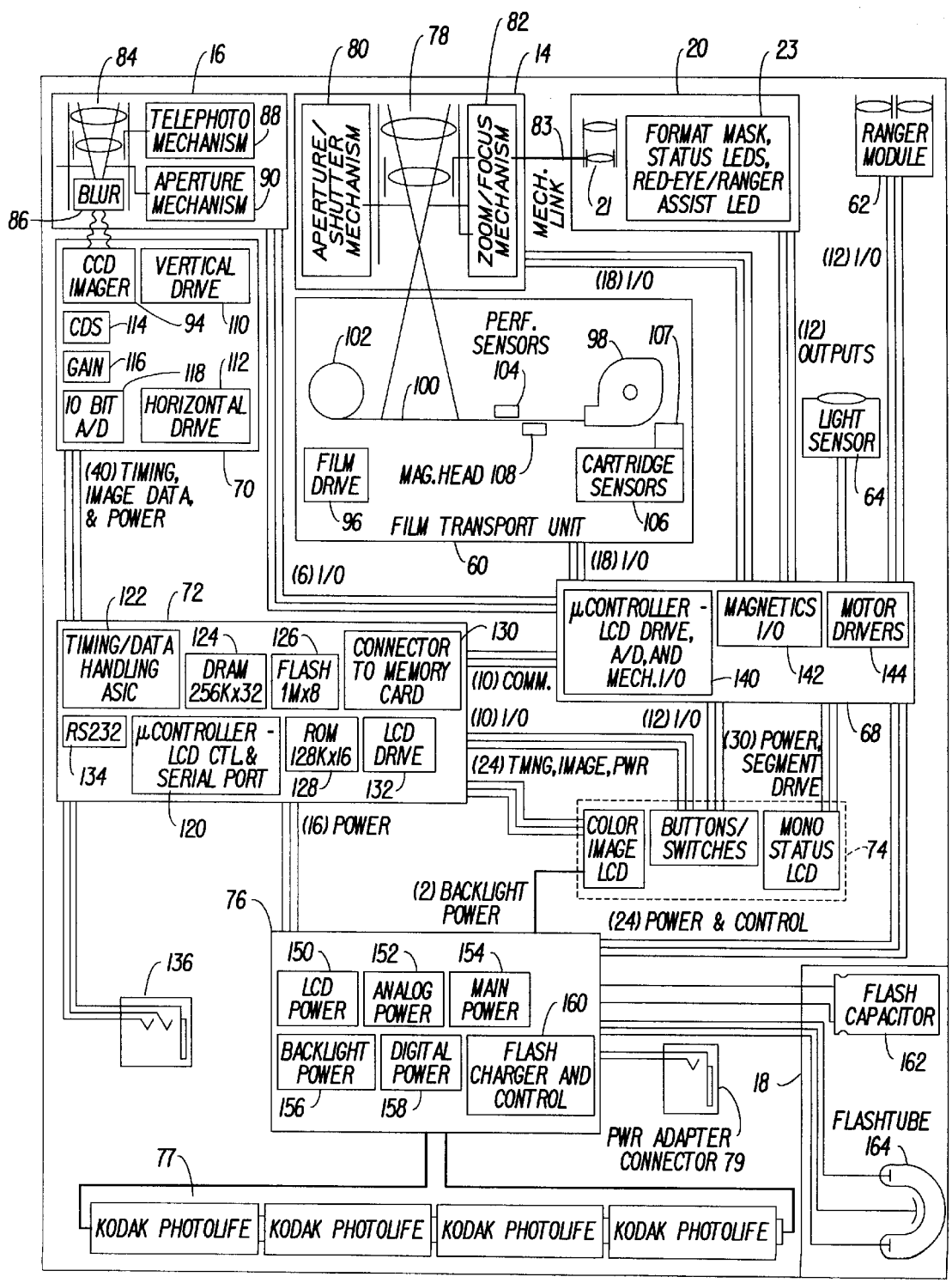
FIG. 6 is a schematic block diagram of the system architecture of the camera illustrated in FIG. 1.

The overall system architecture of the hybrid camera is provided in FIG. 6. The basic system components of the system architecture include the silver-halide optical system 14, the digital imaging optical system 16, the electronic flash unit 18, the optical viewfinder 20, a film transport unit 60, a range finding module 62, a light sensor 64, a main camera controller 68, an analog subsystem unit 70, a digital subsystem unit 72, a camera operator interface 74, and a power supply unit 76. A detailed description of each of the basic system components will be provided below.

The silver-halide optical system 14 preferably includes a multi-element lens 78, an aperture/shutter mechanism 80, and a zoom/focus mechanism 82. The operation of the aperture/shutter mechanism 80 and zoom/focus mechanism 82 is controlled in a conventional manner by the main camera controller 68 to adjust focusing and exposure operations of the silver-halide optical system 14 in response to various inputs including signals received from the range finding module 62, the light sensor 64, the shutter button 24, and zoom control switch 25. The silver-halide optical system 14 is located within the camera body 10 to focus a subject image on a film plane 100 of the film transport 60 during both a film image capture mode of operation and a hybrid image capture mode of operation as will be described in greater detail below.

The digital imaging optical system 16 includes a fixed focus, dual focal length, multi-element lens 84, a blur filter 86, a telephoto drive mechanism 88, and an aperture drive mechanism 90. The telephoto drive mechanism 88 moves part of the lens 84 to provide multiple focal lengths in accordance with instructions received from the main camera controller 68. Similarly, under control of the main camera controller 68, the aperture drive mechanism 90 adjusts an aperture 92 of the digital optical system 16 to a desired setting. The digital imaging optical system 16 is located within the camera body 10 to focus a subject image onto an electronic CCD image sensor 94 provided within the analog subsystem unit 70.

The optical viewfinder 20 is preferably mechanically linked to the zoom/focus mechanism 82 of the silver-halide optical system 14 via a mechanical linkage 83, such that operation of the zoom/focus mechanism 82 causes a corresponding change in the optical system 21 of the optical viewfinder 20. The optical viewfinder 20, as discussed above, includes a masking device 23 that is utilized to appropriately frame the subject image for different imaging formats selected by the camera operator with the image format selector switch 32. In the preferred embodiment, icons located within the viewfinder 20 indicate various operating modes of the camera including digital image capture mode, film image capture mode or hybrid image capture mode. In addition, conventional light-emitting-diode (LED) status indicators are provided within the optical viewfinder 20 to inform the camera operator of various camera conditions while the camera operator is looking through the viewfinder 20.

The electronic flash unit 18, the range finding module 62 and the light sensor 64 are of conventional design. A Fuji AF-Module FM6224T31 (available from Fuji Electric Co., Ltd. of Japan), for example, is preferably utilized as the range finding module 62 to provide subject distance information to the main camera controller 68. Although the light sensor 64 can be implemented as a discrete component to provide light level data to the main camera controller 68, it is preferable to utilize the CCD image sensor 94 provided in the analog subsystem unit 70 to perform the light sensing operation in additional to image capture. Individual pixel elements or groups of pixel elements within the CCD image sensor 94, for example, are sampled prior to an exposure operation to provide light level data to the main camera controller 68, thereby eliminating the need for a separate light level sensor.

The film transport unit 60 includes a conventional film drive 96 that advances photographic film from a film cartridge located in a film chamber 98 to the image plane 100 of the film transport unit 60, where the photographic film is exposed to scene light by the silver-halide optical system 14 described above, and then to a winding spool 102. The film drive 96 also works in reverse in a conventional manner to rewind exposed film from the winding spool 102 back into the cartridge located in the film chamber 98 in response to a rewind signal provided either automatically from the main camera controller 68 or by the activation of a rewind switch on the camera operator interface 74. Various sensors, including a film perforation sensor 104 and cartridge sensors 106, are provide within the film transport unit 60 to provide information regarding the presence and type of the film cartridge and the advance of the film to the main camera control unit 68 in a conventional manner. In addition, at least one magnetic head 108 is provided to write data supplied from the main camera controller 68 to a magnetic layer provided on the photographic film. For example, as in the known film for APS cameras, specific areas located adjacent to each photographic image are defined as camera magnetic recording tracks and photo-finisher magnetic recording tracks where data is magnetically recorded on a magnetic layer of the photographic film. In some applications, it is also desirable for the magnetic head 108 to read data already provided on the magnetic layer of the photographic film for transfer to the main camera controller 68.

The analog subsystem unit 70 includes the CCD image sensor 94, a vertical clock drive circuit 110, a horizontal clock drive circuit 112 and support electronics for the CCD image sensor 94 including a correlated double sample (CDS) circuit 114, a programmable gain amplifier 116, and an analog-to-digital (A/D) converter 118. In a preferred embodiment, the CCD image sensor 94 is a KAI-0320CM device (manufactured by Eastman Kodak Company of Rochester, N.Y.) that includes a 640×480 array of imaging elements with a Bayer color filter array. The signal from the CCD image sensor 94 is provided to the CDS circuit 114, which takes into account a pixel by pixel reference level provided by the CCD image sensor 94. The signal output from the CDS circuit 114 is supplied to the programmable gain stage 116. The use of the programmable gain stage 116 allows the operating range of the system to be extended under low light conditions by boosting the signal level received from the CCD image sensor 94. The programmable gain stage 116 is programmed digitally via a serial data connection provided to the digital subsystem unit 72. The A/D converter 118 converts the sampled and amplified analog signal output from the programmable gain stage 116 into a ten bit digital value. The CDS circuit 114, the programmable gain stage 116, and the A/D converter 118 are preferably implemented with a Philips TDA8786 integrated circuit device. The TDA8786 integrated circuit device also includes a digital-to-analog (D/A) converter (not shown) that is used to control the substrate voltage of the CCD image sensor 94, thereby eliminating the need for a potentiometer or other adjustment to provide this function. Accordingly, manufacturing adjustments for variations in different CCD image sensors are greatly simplified. The D/A converter of the TDA8786 integrated circuit device is programmed by the same serial data connection to the digital subsystem 72 used to program the programmable gain stage 114.

The digital subsystem unit 72 includes a microcontroller 120, an application specific integrated circuit (ASIC) 122 that includes various timing and data handling circuits, a DRAM or non-volatile working memory 124, a non-volatile base camera flash memory 126, a read only memory (ROM) 128, a memory card interface connector 130 for receiving a nonvolatile memory card, LCD interface drive circuitry 132 for driving the main screen unit 36, and a standard communications interface circuit 134 (for example RS232) coupled to a data communications port 136 provided on the main camera body 10. The digital subsystem unit 72 works in cooperation with the main camera controller 68 to control the operation of the various system components. In addition, the digital subsystem unit 72 interfaces with a host computer to perform various operations when the main camera body 10 is coupled to the host computer via the data communications port 136. The data communications port 136 can either be a hard wire type communications port (i.e. requiring a physical connection to the host computer) or a wireless type communication port (for example infrared or RF).

The microcontroller 120 is preferably implemented using a Motorola MPC823 PowerPC based reduced instruction set (RISC) microcontroller. In addition to the PowerPC core, this device includes a serial data communications channel for host communication, timers for monitoring or controlling the lengths of events, an LCD controller for providing image data to the main screen display unit 36, and some digital signal processing (DSP) capabilities to facilitate processing image data. A DRAM controller is also provided by the MPC823 device to allow a direct connection to common DRAM type memories, and bit addressable input/output ports provide for low level control of digital image capture mechanisms, for example, serially programming the Philips TDA8786 integrated circuit device in the analog subsystem unit 70, providing low speed clock signals (line rate and frame rate) to the analog subsystem unit 70, and sensing synchronization event signals from the main camera controller 68 and the timing and data handling ASIC 122.

The timing and data handling ASIC 122 includes basic timing and data handling circuits to provide the interface between the digital subsystem unit 72 and the analog subsystem unit 72 and the analog subsystem 70, the interface between the MPC823's LCD controller and the main screen 36, and the interface between the MPC823 and a nonvolatile memory card connected to the interface connection 130. For example, for the interface between the analog subsystem unit 70 and the digital subsystem unit 72, the ASIC 122 includes an analog subsystem timing chain that provides clocks signals for the various components of the analog subsystem unit 70 as image data flows from the analog subsystem unit 70 and into the digital subsystem unit 72. The timing for the analog subsystem 70 unit is line based, namely, the clocking, conditioning, conversion, and collection of image data for the pixels in a line, but additional timing signals are provided by the microcontroller 120 to begin each line, to begin a frame, and to control electronic exposure. The data handling circuit of the ASIC 122 collects the ten bit image data from the analog subsystem unit 70, applies a function to the data for the purpose of compressing the data from ten bits to eight bits (selectable between a two bit right shift and a fixed function), packs the data into thirty-two bit words, and places the data into a small FIFO (32 bits wide by 2 bits deep) prior to subsequent transfer to the microcontroller 120. For the interface to the main screen 36, the ASIC 122 provides a timing chain that operates in conjunction with the LCD controller of the microcontroller 120 to refresh the main display screen unit 36 by providing both line rate and frame rate signals. The ASIC 122 operates autonomously and requires no periodic intervention from the microcontroller 120 in order to continuously refresh the main display screen unit 36. For the interface to a non-volatile memory card coupled to the interface connector 130, the ASIC 122 isolates the memory card from the bus of the microcontroller 120 and also provides control signal timing for accessing the memory card.

Figure 7:
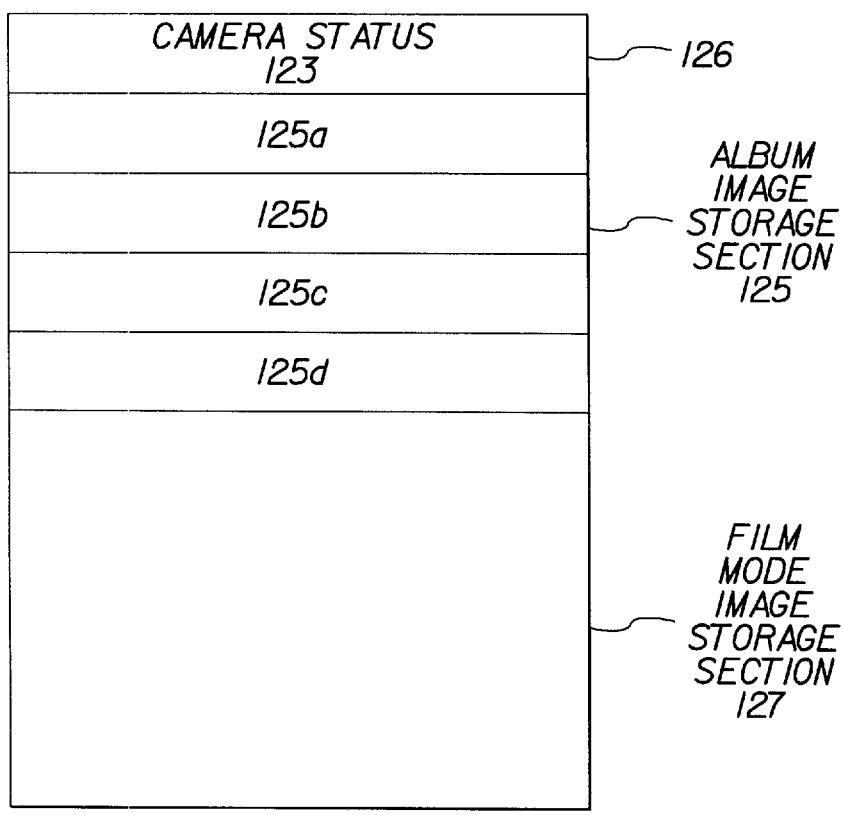
FIG. 7 is a block diagram illustrating the functional division of a base camera memory illustrated in the schematic block diagram of FIG. 6 into a camera status storage section, an album image storage section, and a film mode image storage section.

As described above, the digital subsystem unit 72 includes three types of memory: DRAM based working memory 124, read only memory 128, and EPROM based non-volatile flash base camera memory 126 that is internally fixed within the camera body 10. The working memory 124 is used during image data collection and processing, and also serves as a frame buffer for the main display screen unit 36. The ROM 128 is used to store the basic operating instructions for the microcontroller 120 of the digital subsystem unit 70. The EPROM based non-volatile flash base camera memory 126 is used for storage of album images selected by the camera operator and film mode images captured during the film imaging mode of operation that correspond to photographic images. In addition, the flash memory 126 is also utilized to store basic camera status and operating data including the various operating modes selected by the camera operator. Accordingly, as shown in FIG. 7, the base camera memory 126 is functionally divided into a camera status storage section 123 for storing the camera status and operational data, an album image storage section 125 for storing album images, and a film mode image storage section 127 for storing film mode digital images. As will be described in greater detail, the operator can select certain images for album storage in the album storage section 125 of the base camera memory 126 in addition to storage in a memory card (for example a flash memory card or PCMCIA card) coupled to the interface connector 130 or capture on photographic film. Alternatively, rather than using a removable memory card, base memory 126 could include a non-volatile memory or storage section for high resolution images captured in any mode.

The main camera controller 68 includes a microcontroller 140 that communicates with the digital subsystem unit 72, camera operator interface 74, the light sensor 64 and the range finder module 62, in order to control the operation of the various system components including the silver-halide optical system 14, the digital imaging optical system 16, and the film transport 60. In addition, the main camera controller 68 includes a magnetics I/O circuit 142 and a motor drive circuit 144 to respectively drive the magnetic head 108 of the film transport unit 60 and the various motors in the aperture, telephoto and focusing mechanisms of the silver-halide optical system 14 and the digital imaging optical system 16. The main camera controller 68 also manages power up and power down sequencing, keeps track of calendar and time, and controls the operation of the electronic flash unit 18.

In a preferred embodiment, a Mitsubishi 38000 series microcontroller is utilized for the microcontroller 140 of the main camera controller 68. The Mitsubishi 38000 series microcontroller includes a built-in LCD driver, which can be utilized to drive the LCD status unit 22, and a low speed AID converter with several multiplexed inputs. Several of the AID inputs are used to measure the signals from the perforation sensor 104 and cartridge sensors 106 provided in the film transport unit 60. The Mitsubishi 38000 series microcontroller also has an extremely low power mode with low frequency operation, which allows the microcontroller to wake up periodically to keep track of the time. During camera operation, the microcontroller 140 can switch to high frequency operation for the duration of any events requiring additional processing power, and then switch back to low frequency to conserve power. If a power on event is detected (actuation of the shutter button, opening of the lens cover, opening and closing the film cartridge door, etc.), the microcontroller 140 manages the power up sequencing for other subsystems by enabling appropriate modules within the power supply unit 76. The microcontroller 140 holds the digital subsystem microcontroller 120 in reset until its power supply from the power supply unit 76 is stable. An asynchronous serial interface allows the main camera controller 68 to receive and send commands to and from the digital subsystem unit 72. Various operator controls discussed above that constitute part of the camera operator interface 74 are also sensed by the microcontroller's 140 input lines.

The camera operator interface 74 includes the various operator controls mentioned above in conjunction with the main screen display unit 36 and LCD status unit 22. The LCD status unit 22 is a preferably a monochrome device to reduce power requirements, and includes segments for displaying conventional camera data including: time and date data; battery condition data; film speed data; exposure mode data; flash mode data; the presence of a film cartridge; and the number of film exposures remaining. In addition, the LCD status unit 22 includes a segment that indicates the presence of a memory card coupled to the interface connector 130, and the number of images that can be stored on the memory card. The main screen display unit 36 is a thin film transistor (TFI) type active matrix LCD available from Sharp, which includes 384 cells per row by 220 rows in the display, consequently 84,480 bytes of working memory are required for the display frame buffer of the main screen display unit 36.

The power supply unit 76 preferably provides power to the other subsystems of the camera from four AA cells 77 (lithium or alkaline) or a main source of power via a power adapter connection 79. A number of power modules are provided within the power supply unit 76 that can be independently controlled by the main camera controller 68 including: an LCD power module 150; an analog subsystem module 152; a main power module 154; an LCD backlight power module 156; a digital subsystem power module 158; and a flash charger and control module 160. The LCD backlight power module 156 is adjustable by the main camera controller 68 to allow customer brightness adjustment and automatic compensation for ambient light level. Power can be switched on and off independently for the analog subsystem module 152, the digital subsystem module 158, and the main power module 154. The flash charger and control module 160 charges up a flash capacitor 162 of the electronic flash unit 18. A conventional sensing circuit provides an indication to the main camera controller 68 when the capacitor 160 is charged sufficiently to allow a picture to be taken. The main camera controller 68 triggers the flashtube 164 of the flash unit 18 by means of a dedicated control line. All of the power modules of the power supply unit 76 can be separately enabled and disabled by the main camera controller 68 in order to conserve power.

The basic function of the above-described hybrid camera in three image capture modes of operations will now be described in greater detail. The three image capture modes of operation include: a digital capture mode in which digital mode digital images are captured and stored on a memory card coupled to the interface connector 130; a film capture mode in which photographic images are captured on photographic film and film mode digital images are captured and stored in the base camera memory 126; and a hybrid capture mode in which hybrid mode digital images are captured for storage on a memory card and corresponding photographic images are captured on photographic film. For the purposes of the initial discussion of the three image capture modes, it will be assumed that: a film cartridge has been loaded in the film transport unit 60; a memory card has been connected to the interface connector 130 of the digital subsystem 72; and the camera is in a power down mode in which the main camera controller 68 is waiting for an initialization event.

The main camera controller 68 waits for an initialization event in a power down mode to conserve energy. The initialization event may include, for example, the movement of the lens cover 12 to the extended position, which in turn activates a switch that supplies a corresponding signal to the main camera controller 68 to power-up. In response to the initialization event, the main camera controller 68 enters a power up mode and activates various power modules in the power supply unit 76 to power up the corresponding components of the camera. It should be noted that the analog subsystem unit 70 and electronic subsystem unit 72 are powered-up regardless of the type of image capture mode selected, as a full resolution and full size digital working image is generated and stored in the working memory 124 in each image capture mode. As will be explained in greater detail, however, the processing of the working image varies based on the type of image capture mode selected. The main camera controller 68 activates the LCD status unit 22 to display the camera status information stored in the flash memory 126, and sets the digital optical system 16, silver-halide optical system 14 and viewfinder 20 to the last image format previously selected or alternatively a default format.

At this point, the operator can initiate an exposure operation by activating the shutter button 24. Alternatively, the operator may choose to change either the image format or the image capture mode by operating the image format selector switch 30 and the image capture mode selector switch 23 accordingly. If the image format mode is changed, the main camera controller 68 controls the viewfinder 20 to select the appropriate mask that corresponds to the selected image format setting corresponding to the new image format. The operator may also choose to use the zoom control switch 25 to adjust the lens of the silver halide optical system 14 and the digital optical system 16. The main camera controller 68 controls the operation of the zoom/focus mechanism 82 and the telephoto mechanism 88 in response to signals received from the zoom control switch 25. At the same time, the optical system 21 of the optical viewfinder 20 is adjusted via the mechanical linkage 83 coupled to the zoom/focus mechanism 82. If the operator does not proceed with an exposure operation or the activation of some other camera function within a predetermined time period, the main camera controller 68 deactivates the LCD status unit 22 and controls the power supply unit 76 to once again power down the camera to conserve energy.

As stated above, a digital working image is captured in all three image capture modes of operation that corresponds to an image resolution and has an image size corresponding to an aspect ratio of the CCD image sensor 94. The resolution of a digital image subsequently stored or displayed, however, is varied based on the type of image capture mode selected. In the digital image capture mode, a full resolution digital mode image is stored without cropping in a memory card coupled to the interface connector 130. See FIG. 13A, for example. In the film image capture mode, where the digital image will only be utilized for display on the main screen display unit 36 to show the operator what was captured on film, a film mode image of a lower resolution is prepared by electronically cropping and interpolating the full resolution digital image to respectively correspond to the resolution of the main screen display unit 36 and to the aspect ratio of the photographic film images, and is stored in the base camera memory 126. See FIGS. 13B–D, for example. In the hybrid image capture mode, where it is desirable to match the image size of the digital image to the aspect ratio of the image to be captured on photographic film but retain a high resolution digital image, the digital image is electronically cropped to create a hybrid mode image which is stored in a memory card coupled to the interface connector 30. See also FIGS. 13B–D. Accordingly, a film mode image and a hybrid mode image are essentially cropped versions of the digital mode image with respectively different and equal resolutions.

Prior to exposure in any digital image capture mode, the main camera controller 68 initiates pre-exposure operations, such as autofocusing and exposure control operations to determine subject distance and exposure conditions, in order to properly set the apertures and lenses of the silver-halide optical system 14 and the digital imaging optical 16 system and to determine if flash is required. In a preferred embodiment, the shutter button 24 is a two position switch. When the shutter button 24 is pressed to the first position, a signal is sent to the main camera controller 68 to perform the necessary pre-exposure operations. If the camera is in the power down mode, the movement of the shutter button 24 to the first position also causes the main camera controller 68 to initiate the power up mode prior to performing the pre-exposure operation. When the shutter button 24 is pressed to the second position, an exposure signal is sent to the main camera controller 68 to initiate an exposure operation.

When an exposure operation is initiated in the digital image capture mode, the main camera controller 68 informs the digital subsystem unit 72 that a full resolution and full size digital mode image is to be captured and stored in a memory card coupled to the interface connector 130. The microcontroller 120 of the digital subsystem unit 72 sends the necessary control signals to the analog subsystem unit 70 to initiate image capture with the CCD image sensor 94, to process the analog image signals from the CCD image sensor 94 with the CDS circuit 114, the programmable gain amplifier 116, and the A/D converter 118, and to supply a full resolution and full size digital working image to the working memory 124 of the digital subsystem 72. The full resolution and full size digital working image is then transferred to the interface connector 130 by the microcontroller 120 for subsequent storage in the memory card as a digital mode image.

When an exposure operation is initiated in the film capture mode, a full resolution and full size digital working image is again supplied from the analog subsystem unit 72 to the working memory 124 of the digital subsystem unit 70. At the same time, the aperture/shutter mechanism 80 of the silver-halide optical system 14 is activated by the main camera controller 68 so that scene light is supplied to the image plane 100 of the film transport unit 60. Accordingly, a photographic film image is captured that corresponds to the digital working image stored in the working memory 124. In the case of the film capture mode, however, the digital image will be utilized primarily for display purposes to enable the camera operator to verify what was captured on the corresponding photographic film image. However, by using main control unit 38 to enter an editing mode and using the display of FIG. 15, the last captured digital image may still be stored in the memory card. To store a film image for display, the microcontroller 120 of the digital subsystem unit 72 generates and transfers a lower resolution representation of the full resolution digital working image as a film mode image in a film image storage section of the flash memory 126. In addition, the working image is cropped in size so that the film mode image corresponds to the aspect ratio of the corresponding photographic film image, as the film mode image need only contain the same scene information as the corresponding photographic film image. The reduction of the resolution and size of the film mode image permits the size of the film image storage section in the flash memory 126 to be minimized. As the flash memory 126 is integrated and internal to the camera structure, it is preferable to minimize the amount of memory required for the flash memory 126 in order to reduce the expense and size of the overall camera. Accordingly, standard image compression techniques, for example JPEG, are preferably utilized to compress the film mode image prior to storage. The film mode image is preferably tagged with identification data (ID data) the indicates the film frame number of the corresponding film image, so the film mode images stored in the film mode image storage section 127 can be properly matched to their corresponding photographic film images when displayed on the main screen display unit 36 in response to a display signal supplied to the microcontroller 120 from the camera operator interface 74.

In the hybrid image capture mode, a full size working image is again captured with a corresponding photographic film image and supplied to the working memory 124 of the digital subsystem 70. As in a film mode capture operation, the microcontroller 120 does not transfer the complete digital image, but generates and transfers a reduced sized digital image to the interface connector 130 for storage in the memory card as a hybrid mode image. The reduced sized hybrid mode digital image, as with the film mode image, has an aspect ratio that corresponds to the aspect ratio of the corresponding photographic film image, but maintains the same resolution as the working image stored in the working memory 124. The effective cropping of the size of the working image to match the aspect ratio of the corresponding photographic image allows for a reduction in the amount of memory required to store a hybrid mode image as compared with a digital mode image. Accordingly, a greater number of hybrid mode images can be stored on the memory card as compared with digital mode images. In the case of either hybrid mode images or digital mode images, it is further preferable to have the microcontroller 120 compress the images prior to storage as with the film mode images. Although a loss of information results from the cropping of the working images when storing a hybrid mode image, the image information removed to produce the hybrid mode image is not required, as the hybrid mode image contains the same image information as the corresponding photographic image. If the camera operator wishes to retain all image information, then a digital mode image should be captured instead of a hybrid mode image in the illustrated embodiment.

In a preferred embodiment, the last captured working image remains in the working memory 124 until a new exposure operation is initiated regardless of the image capture mode selected, and regardless of whether the film cartridge is removed from the film chamber 98 or the memory card is removed from the interface connector 130. A quick review switch 37, illustrated in FIG. 5, is provided on the back of the camera body 10. At any time after the capture of an image and before capture of a next image, the review switch 37 can be activated by the camera operator to display the last captured working image on the main screen display unit 36 as a review image. The last captured working image thus can be displayed without requiring the availability of the non-volatile memory of the memory card. Activation of the review switch 37 provides a signal to the microcontroller 120 to initiate the transfer of the working image stored in the working memory 124 to the LCD drive circuit 132 for subsequent display on the main screen display unit 36 as a review image. It should be noted that during the exposure operation described above, the main screen display unit 36 is not activated unless specifically turned on by the camera operator. Accordingly, when the review switch 37 is activated, the microcontroller 120 activates the main screen display unit 36 to display the review image, either for a predetermined period of time or until the review switch 37 is deactivated, and then deactivates the main screen display unit 36 to enter the power conservation mode.

In contrast to the last working image, the film mode images stored in the film mode image storage section 127 of the flash memory 126 are preferably erased by the microcontroller 120 when the film is rewound into the cartridge. The size of the film mode image storage section 127 of the flash memory 126 need therefore only be sufficient to store a number of film mode images corresponding to the maximum number of film images that could be captured on one film cartridge. As stated above, it is desirable to limit the size of the film mode image storage section 127 to reduce the expense and size of the camera. Accordingly, in the preferred embodiment, digital images corresponding to images captured on photographic film are only retained in the hybrid image capture mode unless selected for album storage as will be described in greater detail.

The camera operator can initiate a review of all digital images stored in either a memory card or the base camera memory 126 by activating the main screen display unit operation switch 39, thereby sending a display signal to the microcontroller 120. Review of film mode images corresponding to images captured on film is accomplished by setting the main screen display unit operation switch 39 to the illustrated "F" or "FILM" setting. In response, the microcontroller 120 retrieves the digital film mode image stored in the film mode image storage section 127 of the base camera memory 126 corresponding to the last photographic film image taken and displays the image on the main screen display unit 36. The camera operator can then manually scroll through digital film mode images in forward and reverse directions by utilizing the right directional switch 48 of the main screen operator control unit 38 or the left directional switch 52. Similarly, digital images stored in either the digital image capture mode or hybrid image capture mode can be displayed and scrolled by utilizing the same directional switches and setting the operation switch 39 to the illustrated "D" or "DIGITAL" setting. In addition, instead of starting at the last image stored in either the base camera memory 126 or the memory card, a menu option window can be displayed on the main screen display unit 36 to allow the operator to select a specific image as the first image to be displayed.

Figure 8:
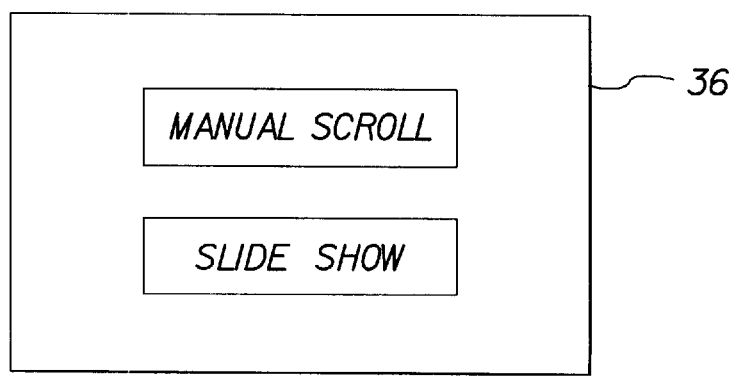
FIG. 8 is an illustration of a user interface window displayed on the main screen display unit illustrated in FIG. 5 for selecting a scroll option.
Figure 9:
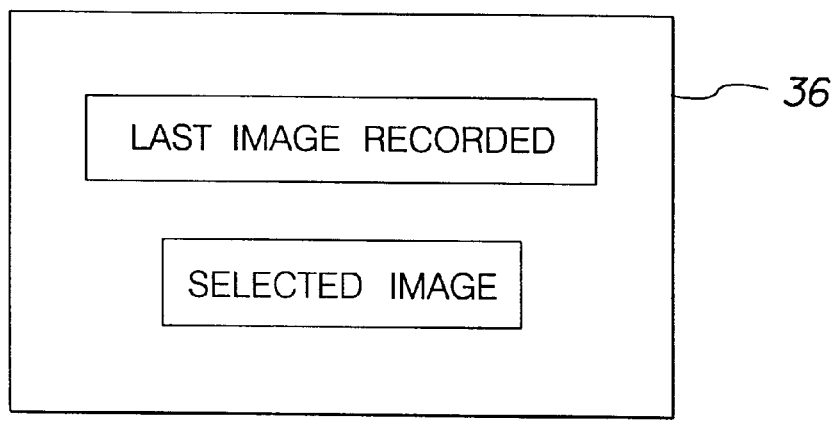
FIG. 9 is an illustration of a user interface window displayed on the main screen display unit illustrated in FIG. 5 for selecting a starting image for the scrolling function illustrated in FIG. 8.
Figure 10:
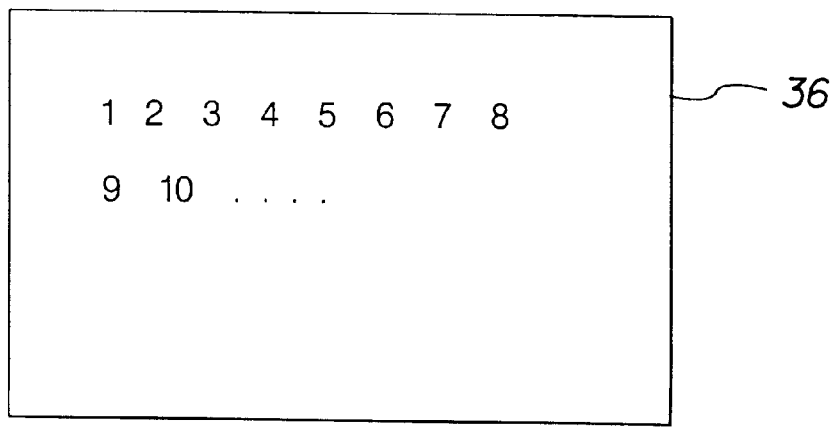
FIG. 10 is an illustration of a user interface window displayed on the main screen display unit illustrated in FIG. 5 for selecting a specific image number as a starting image for the scrolling function illustrated in FIG. 8.

Still further, instead of requiring the operator to enter a manual command to scroll through each image, a "slide show" option is preferably provided to allow the automatic scrolling of images after either predetermined time periods or time periods selected by the operator. For example, upon setting the operation switch 39 to a selected setting, the microcontroller 120 of the digital subsystem 72 sends a scroll option window to the main screen display unit 36 for display. The scroll option window includes a "Manual Scroll" icon and an "Slide Show" icon as illustrated in FIG. 8. The camera operator utilizes the main screen operator control unit 38 to enter control signals to the microcontroller 120 to select the desired scroll option. The microcontroller 120 sends an image selection list to the main screen display 36 for operator selection that includes a "Last Image Recorded" icon and a "Selected Image" icon as shown in FIG. 9. If the "Last Image Recorded" icon is selected by the operator, the microcontroller 120 controls the transfer and display of the stored digital images in either manual or automatic scrolling modes starting with the last image recorded and then decrements. If the "Selected Image" icon is selected by the operator, the microcontroller 120 controls the display unit 36 to display a selected image list as illustrated in FIG. 10. The operator can then scroll through the numeric list and select the desired starting image using the main screen operator control unit 38. Alternatively, different user interfaces can be employed, for example scrolling numbers or the display of a virtual keyboard on the display unit 36, to allow the operator to select a specific image as the start image. Still further, a small keyboard or keypad can be incorporated in the camera as part of the camera operator interface 74. If the automatic scroll mode is selected, a further user interface window (not shown) is displayed on the main display screen 36 to allow the operator to select a desired time period between images or a default time period previously stored in memory.

Figure 11:
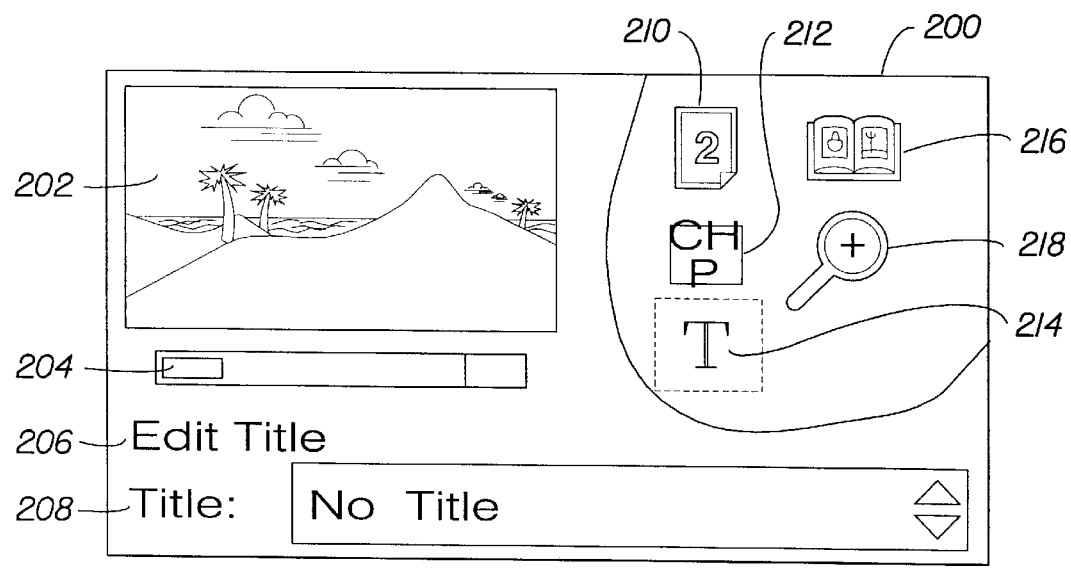
FIG. 11 is an illustration of a graphical user interface displayed on the main screen display unit illustrated in FIG. 5 for a title function.

In addition to scrolling through the stored images, a more advanced graphical user interface can be incorporated to permit the operator to select various camera functions. For example, as shown in FIG. 11, camera function icons are displayed in an icon group 200 on the main screen display unit 36 to edit information related to the images (including conventional APS data), obtain help information, enter user defined data into the camera or perform other functions. An image display area 202 is used to display the digital image being reviewed or edited the display area 202 to indicate the respective position of the displayed digital image in its associated memory. A function name display area 206 displays the camera function currently selected. A function data entry area 208 displays data associated with the selected camera function. If desired, the icon group 200 can be generated as transparent icons that can be laid over the displayed digital image, so that the size of the image display area 202 can be expanded and the camera operator can see the displayed digital image through the displayed icons.

Each camera function selectable by the camera operator has a corresponding individual icon in the icon group 200. In the illustrated example, a copy number function is accessed by selecting a copy number icon 210, an image format function is accessed by selecting an image format icon 212, a title function is accessed by selecting a title icon 214, an album function is accessed by selecting an album icon 216, and a magnifying function is accessed by selecting a magnification icon 218. The camera operator activates the edit switch 40 to cause the first function icon displayed in the icon group 200, in this case the copy number icon 210, on the main screen display unit 36 to be highlighted. The up directional switch 46 and the down direction switch 50 are utilized to advance through the displayed function icons until the desired title icon 208 is highlighted. For example, by activating the down direction switch 50 twice, the highlighted icon sequentially moves from the copy number icon 210 to the image format icon 212 and then to the title icon 214. Once the desired function icon is highlighted, for example the title icon 214, the operator presses the edit switch 40 to enter the highlighted function mode. The name of the function mode is displayed in the function name display area 206 of the main screen display unit 36 and the current data for the selected image is displayed in the function data entry area 208. In the case of titles, the up directional switch 46 and the down directional switch 50 are utilized to scroll through pre-programmed titles. Alternatively, the operator can enter a desired title by scrolling through and selecting individual characters displayed in the function data entry area 208. A function is exited by pressing the exit switch 42.

In a preferred embodiment, if the operator changes the title of one digital image and then uses the directional switches to selected another digital image without exiting the title function, the title selected for the previous digital image will be automatically selected for the newly selected digital image. The title will continue to be maintained for all digital images viewed in the title function mode until the camera operator either exits the function or selects a new title. Accordingly, the camera operator can modify a sequence of images to have the same title in a quick and convenient manner.

Figure 12:
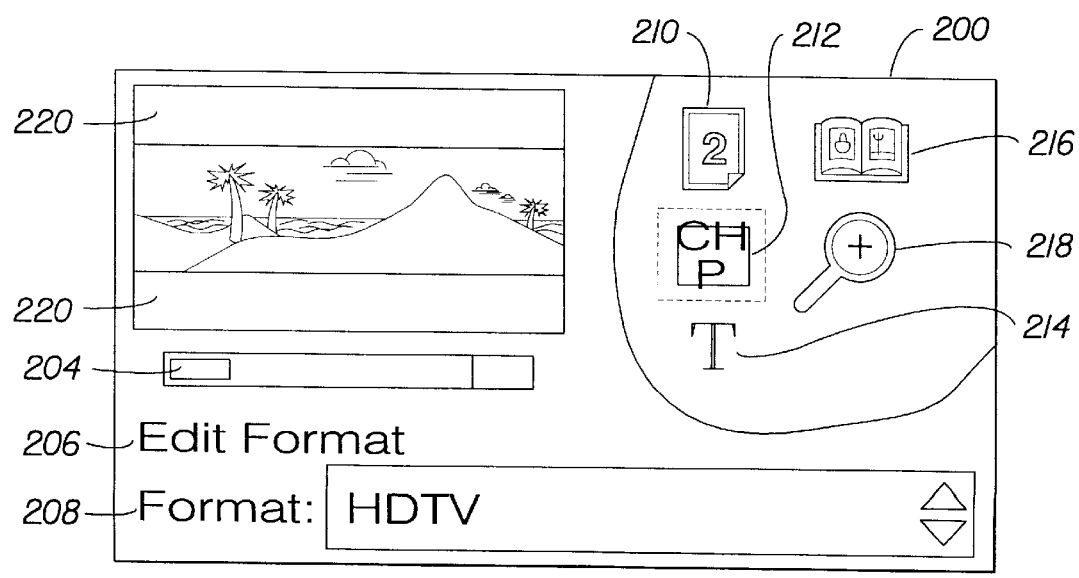
FIG. 12 is an illustration of a graphical user interface displayed on the main screen display unit illustrated in FIG. 5 for an image format function.
Figure 13A:
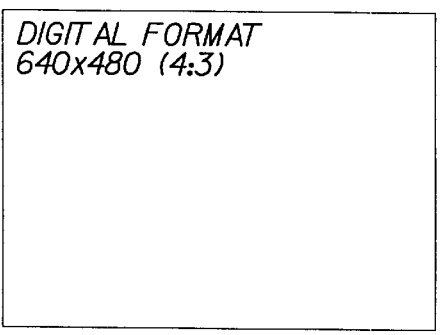
FIGS. 13A, B, C and D are illustrations of the a digital mode image format, a hybrid or film mode HDTV image format, a hybrid or film mode panoramic image format and a hybrid or film mode classic image format.
Figure 13B:
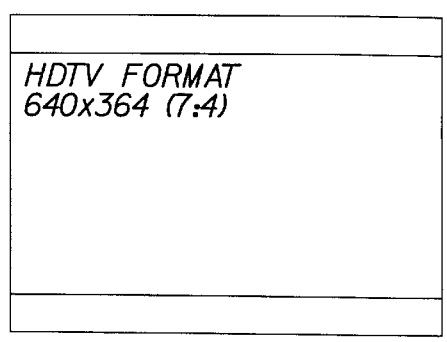
Figure 13C:
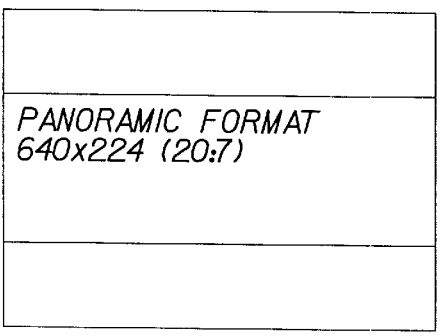
Figure 13D:
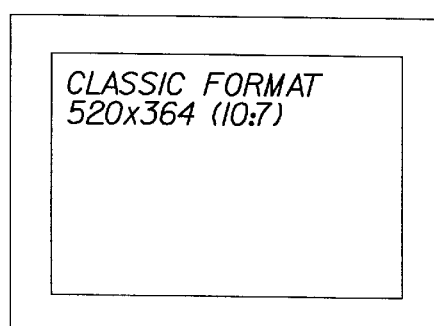

The camera operator can change the image format of the displayed hybrid or film mode image by selecting the image format function icon 212 to enter the image format function as illustrated in FIG. 12. The operator can select image formats including classic, HDTV and panoramic formats associated with conventional APS cameras. Film mode images and hybrid mode images are stored and displayed on the main screen display 36 in a 9:16 aspect ratio corresponding to the aspect ratio of the silver-halide image system 14, and digital mode images are stored and displayed in a 3:4 aspect ratio corresponding to the aspect ratio of the CCD image sensor 94. The image format selected by the operator before the image was captured is displayed in the function data entry area 208. The operator then uses the main screen operator control unit 38 to edit the image format selection. In a preferred embodiment, the full available digital image for a given image capture mode is displayed and a mask 220 may be used to indicate to the operator which portions of the image will be excluded for a given selected digital image, when an eventual photographic print is made from the corresponding film image. FIG. 12, for example, illustrates a digital mode image that is being displayed in HDTV format. Accordingly, the operator can change an image format, for example from classic format to a panoramic format, and compare the differences between the two formats before making a final decision as to which format is desired for the selected image. FIG. 13A illustrates an uncropped digital format. FIGS. 13B, C and D illustrate the same digital format cropped, respectively, to the film or hybrid HDTV format, the film or hybrid panoramic format, and the film or hybrid classic format.

Figure 14:
FIG. 14 is a schematic block diagram illustrating an image record for a digital image.

The film mode images, hybrid mode images and digital mode images are stored as image records that include an ID file, an image information file (IIF) and an image data field (IDF) as illustrated in FIG. 14. The ID file contains data identifying the images and includes, for example, the frame number tag of a corresponding photographic film image in the case of film mode images and hybrid mode images. The IIF contains image data related to the images and includes, for example, conventional APS data in addition to other data associated with the image that can be entered by the camera operator through the camera operator interface 74 or downloaded via the data communications port 136. The IDF contains the actual pixel data for the digital image. When an editing operation is performed, the IIF for the corresponding digital image is updated with the edited data by the microcontroller 120. Further, in the cased mode images, the operator edited data is also written back to the magnetic recording tracks of the corresponding photographic film image. Accordingly, changes selected by the operator, as with data written to the film during the image capture operation, can be transmitted to a photo finisher with the exposed photographic film.

Data is conventionally written to the magnetic recording tracks of the photographic film by the magnetic head 108 after an exposure operation is completed and the film is advanced from one frame to the next frame by the film transport unit 60. Accordingly, when editing information has been entered with respect to film mode images or hybrid mode images, the photographic film is rewound and advanced once again by the film transport unit 60 so that the edited data can be written to photographic film by the magnetic head 108. Alternatively, the editing information can be written to the photographic film during a rewind operation prior to removing a film cartridge from the camera. In this manner, it is possible to edit data written to the photographic film at any time, either prior to the removal of the film cartridge 98 or even after re-insertion of a film cartridge into the film chamber 98.

Figure 15:
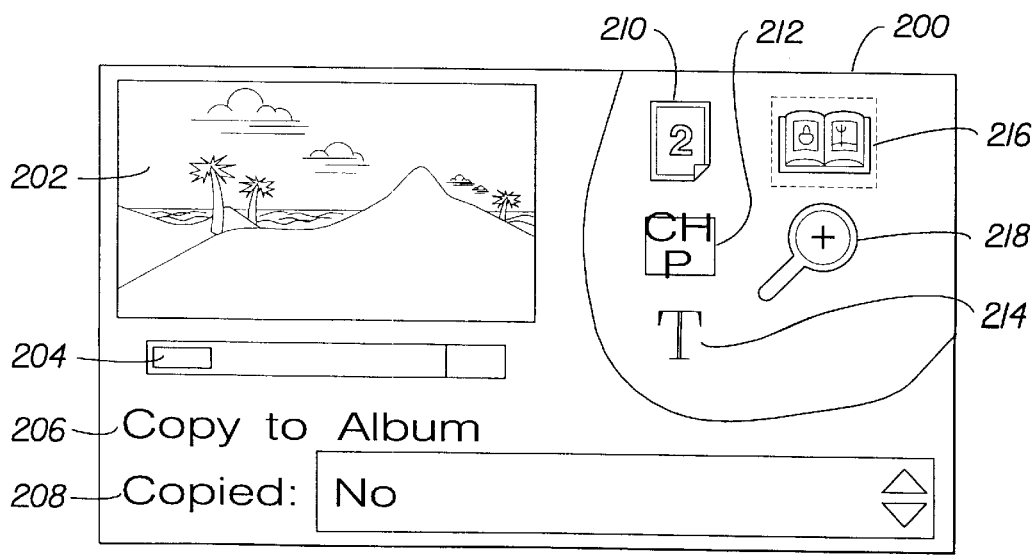
FIG. 15 is an illustration of a graphical user interface displayed on the main screen display unit illustrated in FIG. 5 for an album function.

If the camera operator would like to save a particular image for future review, even after a film cartridge or memory card is removed, the camera operator can select the album function icon 216 in the function icon group as illustrated in FIG. 15. When the album function 216 is selected, the digital image displayed on the main screen display unit 36 can be selectively stored as an album image in the album image storage section 125 of the base camera memory 126 by using the directional switches to select either a "Yes" or "No" album copy option. A stored album image remains in the base camera memory 126 until specifically deleted by the camera operator. Accordingly, the camera includes an integrated album of stored images that remains with the camera. If desired, the album image storage section 125 of the non-volatile flash memory 126 can be further sub-divided into different album storage sub-sections (125*a*, 125*b*, 125*c*, 125*d*, etc. as shown in FIG. 7), so that the camera operator can store related images (for example related by subject, date or time) in the same album subsection or different camera operators can utilize different album sub-sections to store their respective images. In the event of different camera operators, password protections are preferably utilized so that deletion and/or viewing of images can be performed only by the operator that stored the images.

Album images, as with film mode images, have a resolution corresponding to the resolution of the main screen display unit 36. The size of the album image preferably corresponds to the size of the underlying digital image selected for album storage. For example, if a film mode image or a hybrid mode image is selected for album storage, the size of the album image will correspond to the image size of the hybrid mode image. Alternatively, if a digital mode image is selected from album storage, the size of the album image will correspond to the image size of the digital mode image.

Figure 16:
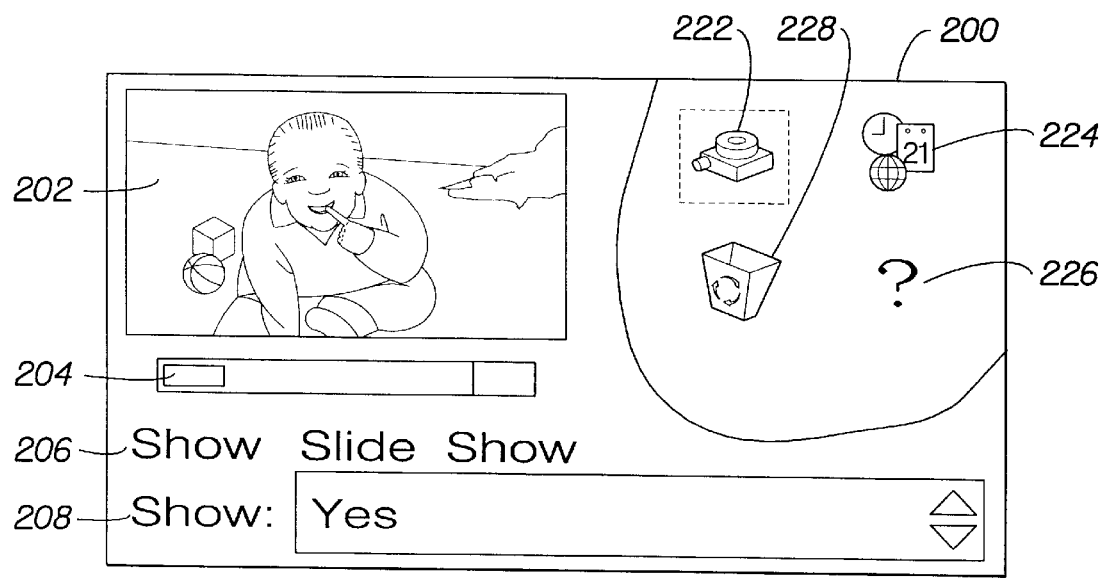
FIG. 16 is an illustration of a graphical user interface displayed on the main screen display unit illustrated in FIG. 5 for a slide show function.

The images stored in the album may be accessed by setting display unit operation switch 39 to the "A" or "ALBUM" position shown in FIG. 5. An image in the album will be displayed on main display unit 36. The directional switches 48, 52 may then be used to scroll up or down and change the image displayed. The edit switch 40 may be used to display the screen of FIG. 16 and the slide show feature discussed above can also be utilized to display the album images. FIG. 16, for example, illustrates a slide show icon 222 that, when selected, allows the camera operator to activate the slide show feature. While in the slide show function, the up directional switch 46 and the down directional switch 50 are used to control the speed at which images are presented or a default speed can be utilized. In a preferred embodiment, the microcontroller 120 will control the display of each album image once when the camera is powered by batteries 77 and then exit the function to conserve energy. When the camera is connected to a main power source via the power adapter connector 79, the microcontroller 120 will control the display of the album images so that they continue to scroll through until the operator activates the exit switch 42. A delete icon 228 may be used to remove images from the album.

Other functions include a magnifying function that allows the operator to temporarily magnify the image of the main display screen 36 when the magnification icon 218 is selected, a utilities function that allows the operator to enter time and date information when the utilities icon 224 is selected, a help function that the operator can access to obtain information from a help menu when the help icon 226 is selected, and a print copy function that can be accessed by clicking on the print copy icon 210. By entering the number of print copy function, the camera operator can select the number of prints desired from a photographic film image corresponding to either a film mode digital image or a hybrid mode digital image. The number of prints data is then written to the corresponding photographic film image by the magnetic head 108. Similarly, an image processing function is preferably incorporated that permits the operator to crop and pan images, where the image processing data is written to the photographic film for subsequently retrieval and use by a photo finisher.

Figure 17:
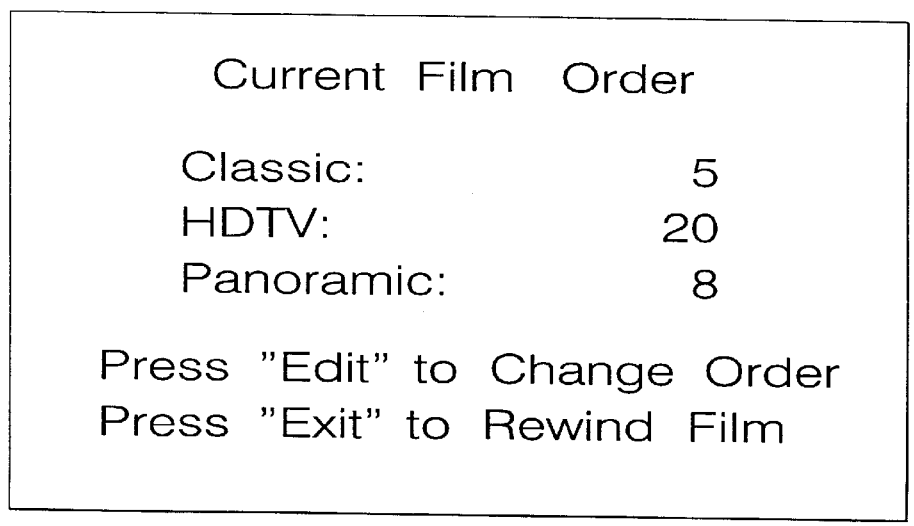
FIG. 17 is an illustration of a current film order status window displayed on the main screen display unit illustrated in FIG. 5.

In order to offer the operator the opportunity to edit image information prior to removal of a film cartridge from the film chamber 98, it is preferable not to have the film automatically rewind after the completion of a roll. Instead, an indicator is provided, for example an LED indicator in the viewfinder, informing the camera operator that the end of roll has been reached. At this point, the camera operator can press a rewind switch to institute film rewinding if editing of image information is not desired. If editing is desired, however, the camera operator turns on the main display unit 36 the microcontroller 120 causes a current film order window of the type illustrated in FIG. 17 to be display indicating the type of images captured. The camera operator can then activate the edit switch 40 to cause the camera to go into the modes described above or activate the exit switch 42 to cause film rewinding.

Figure 18:
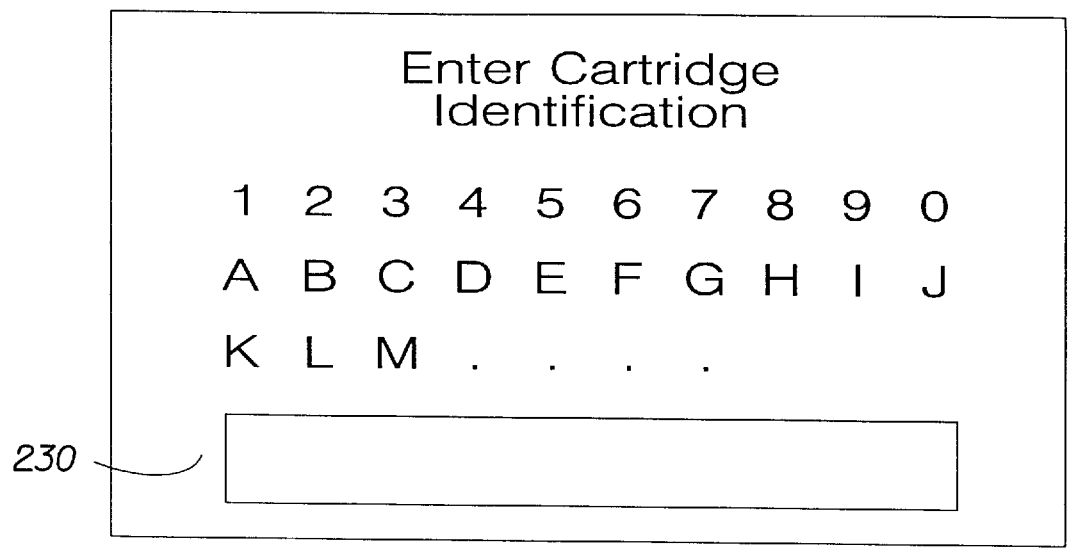
FIG. 18 is an illustration of a graphical user interface displayed on the main screen display unit illustrated in FIG. 5 for entering cartridge identification information.

It is desirable to provide a mechanism for identifying the hybrid mode images stored on the memory card with the film cartridge containing the corresponding film images. In one embodiment, the detection of the insertion of a film cartridge by the cartridge sensors 106 causes the microcontroller 120 to display a film cartridge identification prompts illustrated in FIG. 18. The camera operator then utilizes the main screen operator control unit 38 to scroll through alphanumeric characters until a desired character is highlighted. The camera operator then presses the edit switch 40 to select the highlighted character which is then displayed in a ID display area 230. The camera operator continues to select characters until the exit switch 42 is pressed to exit the function. The user is prompted to enter a roll identification code each time a film cartridge is inserted into the film chamber 98. The microcontroller 120 then tags each film mode image and hybrid mode image with the roll identification code and frame number for each corresponding photographic image as part of the ID file.

Alternatively, an automatic mechanism for providing roll identification can be incorporated into the camera. For example, the cartridge sensors 106 include a cartridge identification sensor 107 that reads an optically encoded or magnetically encoded roll or cartridge identification code provided on a film cartridge, and supplies the identification code to the main camera controller 68 for transfer to the microcontroller 120. The microcontroller 120 can therefore automatically tag each digital image, whether a film mode image or hybrid mode image, with the corresponding film cartridge ID. Although it is preferable to include the cartridge identification sensor 107 within the film chamber 98, it is also possible to provide the cartridge identification sensor 107 in the main body 10 of the camera in a manner permitting the camera operator to pass a film cartridge over the cartridge identification sensor 107 prior to inserting it into the film chamber 98. Also, the CCD array 94 could be used to image an identification code on a cartridge held before the camera, after which controller 120 would process the image of the cartridge to extract the code. Still further, the main body 10 can be provided with a detachable "wand" with the cartridge identification sensor 107 located on the end of the wand, thereby allowing the camera operator to scan the film cartridge with the wand to enter the cartridge identification data. In addition, roll or cartridge identification code can be provided on the magnetic layer of the photographic film, such as in the form of a header file on the leader portion of the film. The magnetic head 108 is then used to read the header file and transfer the roll identification code to the main camera controller 74 and subsequently the microcontroller 120. The microcontroller 102 then stores the roll identification code as part of the ID file for a hybrid mode image or a film mode image.

In a preferred embodiment, only those hybrid mode images corresponding photographic film images located on the film cartridge presently retained within the camera -are displayed during a scrolling, review or editing operation, thereby preventing the camera operator from editing information related to a hybrid mode image when the editing information cannot be stored on the corresponding photographic film image. Alternatively, the camera operator may be permitted to scroll through all of the hybrid mode images stored on the memory card. In the event, however, that the camera operator attempts to edit a hybrid mode image that does not have a corresponding photographic film image on the presently retained film cartridge, a warning indication is displayed on the main display screen unit 36 advising the operator to insert the correct film cartridge. Once the correct film cartridge is inserted, the camera operator is permitted to edit the information and the information is updated on the magnetic recording tracks of the corresponding photographic film image.

In a further embodiment, instead of writing a cartridge identification code on the hybrid mode image, a memory card identification code can be written to a film cartridge or the magnetic recording tracks of each corresponding photographic film image. In such a case, the microcontroller 120 keeps an identification table that indicates which film exposure corresponds to a given hybrid mode image. For example, when a film cartridge is removed, the information contained in the table is written to the photographic film, preferably in the form of a header file at the leader portion of the photographic film. Accordingly, when a memory card is inserted into the camera and the editing mode is selected to edit hybrid mode images, the microcontroller 120 can identify whether the film cartridge presently in the camera would contain images corresponding to the hybrid mode image desired to be edited. If not, the operator is notified and prompted to change the film cartridge. When a new cartridge is entered the identification table is updated with the information corresponding to that particular cartridge. It would be apparent to those of ordinary skill in the art that other addressing schemes can be employed to provide identification tags for corresponding rolls and memory card.

Figure 20:
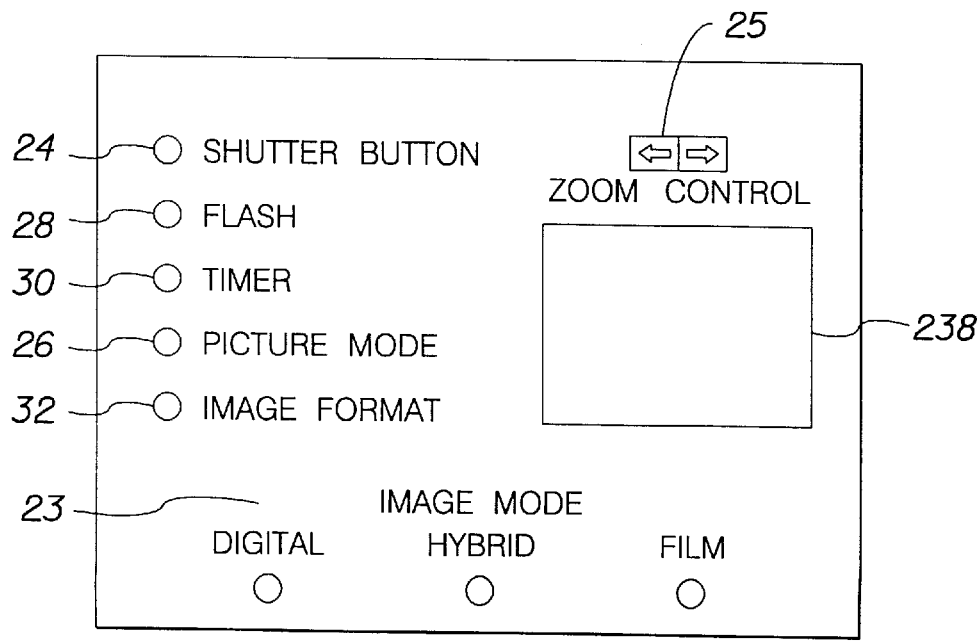
FIG. 20 is an illustration of a graphical user interface displayed on a monitor of the host computer illustrated in FIG. 19 for entering camera commands.
Figure 19:
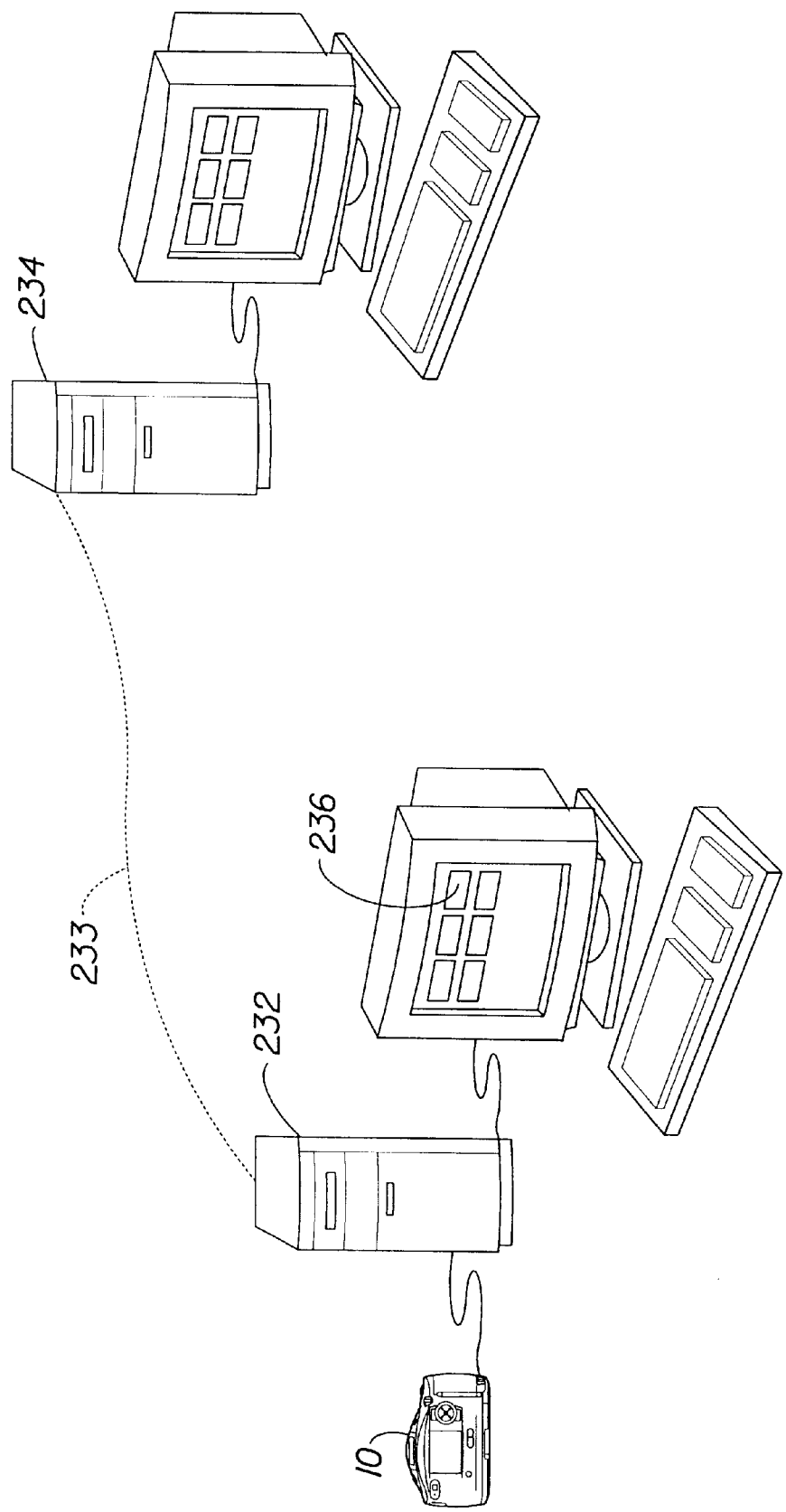
FIG. 19 is schematic diagram illustrating the connection of a camera in accordance with the invention to a host computer.

As illustrated in FIG. 19, the camera body 10 can be connected to a host computer 232 via data communication port 136. When tethered to the host computer 232, all operator inputs usually selected by the various switches provided by the camera operator interface 74 can be sent to the camera by the host computer 232. Accordingly, the camera can be operated remotely by a local operator working on the host computer 232 or a remote operator working on a remote computer 234 linked to the host computer 232 by any form of communication link 233. In one embodiment, a graphical user interface is displayed on a monitor 236 of the host computer 232 (or the remote computer 234) including virtual switches representing each of the actual control switches of the camera as illustrated in FIG. 20. Utilizing an interface device such as a "mouse", the operator can "click" on any of the virtual control switches to activate the corresponding function in the camera as if the actual button or switch on the camera were being depressed.

As it may be desirable to have the computer operator remain at the computer instead of using the viewfinder 20 to frame a subject image, a virtual viewfinder is provided by utilizing the CCD image sensor 94 to image the subject scene, either in a still image mode or a motion image mode, and supply a digital viewfinder image 238 to the computer monitor 236 for viewfinding purposes. For example, a working image is captured every second and supplied from the working memory 124 to the host computer 232 via the data communication port 136 under control of the microcontroller 120. When the subject image is appropriate, the computer operator then activates the virtual shutter button displayed on the computer monitor 236 to cause image capture.

The computer operator can perform a variety of image processing functions on digital images downloaded from the camera. For example, image processing software can be utilized in the host computer 232 to perform zoom, pan and crop functions on any portion of a displayed image, attach special borders for special occasions, and print the edited images on a printer. Image data generated by the host computer 232 can be transferred back to the camera to update the image information files of film mode images stored in the base camera memory 126 or of hybrid mode and digital mode images contained in a memory card coupled to the interface connector 130. In addition, data generated by the host computer can be transferred to the camera for writing on the magnetic layer of the photographic film by the magnetic head 108. Accordingly, a computer operator can generate photo-finishing data on the host computer 232 and transfer the photo-finishing data directly to the photographic film in the camera, such that when the film is presented to a photo-finisher, the data can be retrieved from the photographic film and utilized in a photo-finishing operation. Still further, album images contained in the host computer 232 can be transferred to the camera for storage in the album image storage section 125 of the base camera memory 126.

The utilization of the host computer 232 to perform editing operations provides the advantage of having more advanced processing power available to perform the editing operations and a larger monitor making it easier to view the edited images. However, the same editing functions can be included within the functions available to the camera operator. The camera operator can therefore perform image processing functions including zooming, cropping and panning utilize the camera control interface 74 in conjunction with a user interface displayed on the main display screen unit 36. Similarly, data corresponding to the editing operation is stored on the photographic film by writing the editing data to the film with the magnetic head 108.

The camera structure described above provides a number of distinct technical advantages. The provision of the album image storage section 125 in the internal base camera memory 126 provides a convenient and practical method of allowing the camera operator to store digital images that can be easily transported and displayed. The provision of the quick review switch 37 enables an camera operator to quickly review the last image captured, while at the same time conserving energy by allowing the main display screen 36 to remain deactivated until specifically required for the quick review. The provision of the data communication port allows the camera to be conveniently coupled to the host computer 232, thereby allowing the host computer 232 to control the operation of the camera. In addition, the host computer 232 can transfer data, including album images, directly for storage in the main camera memory 126 or a memory card coupled to the interface connector 130, and also transfer data to photographic film contained in the camera by writing the data to the photographic film with the magnetic head 108. Still further, the camera operator interface 74 in operation with the main display screen unit 36 provides a convenient method of entering cartridge identification data into the camera, thereby allowing hybrid mode images stored on a memory card to be tagged with the cartridge identification code of a film cartridge containing corresponding photographic images.

The invention has been described with reference to certain preferred embodiments thereof. It will be understood, however, that modifications and variations are possible within the scope of the appended claims. For example, the invention has been described with reference to an exemplary graphical user interface. It will be understood, however, that specifics of the user interface utilized to present and select camera functions can vary widely. In addition, modifications in the overall architecture of the camera are possible. For example, a single optical system can be utilized to provide scene light to both the CCD image sensor 94 and the image plane 100 of the film transport unit 60.

Parts List

- 10 ... main camera body
- 12 ... sliding lens cover
- 14 ... silver-halide optical system
- 16 ... digital imaging optical system
- 18 ... electronic flash unit
- 19 ... masking device
- 20 ... optical viewfinder
- 21 ... optical system
- 22 ... LCD status unit
- 23 ... image capture mode selector switch
- 24 ... shutter button
- 25 ... zoom control switch
- 26 ... picture taking mode selector switch
- 28 ... flash mode selector switch
- 30 ... timer mode selector switch
- 32 ... image format selector switch
- 34 ... hinged support element
- 36 ... main screen display unit
- 37 ... review switch
- 38 ... main screen operator control unit
- 39 ... display mode selection switch
- 40 ... edit switch
- 42 ... exit switch
- 44 ... directional switch unit
- 46 ... up directional switch
- 48 ... right directional switch
- 50 ... down directional switch
- 52 ... left directional switch
- 54 ... memory card door
- 56 ... battery compartment door
- 58 ... film chamber door
- 60 ... film transport unit
- 62 ... range finding module
- 64 ... light sensor
- 68 ... main camera controller
- 70 ... analog subsystem unit
- 72 ... digital subsystem unit
- 74 ... camera operator interface
- 76 ... power supply unit
- 77 ... AA cells
- 78 ... multi-element lens
- 79 ... power adapter connector
- 80 ... aperture/shutter mechanism
- 82 ... zoom/focus mechanism
- 84 ... multi-element lens
- 86 ... blur filter
- 88 ... telephoto drive mechanism
- 90 ... aperture drive mechanism
- 92 ... aperture
- 94 ... image sensor
- 96 ... film drive
- 98 ... film chamber
- 100 ... image plane
- 102 ... winding spool
- 104 ... film perforation sensor
- 106 ... cartridge sensors
- 107 ... cartridge identification sensor
- 108 ... magnetic head
- 110 ... vertical clock drive circuit
- 112 ... horizontal clock drive circuit
- 114 ... CDS circuit
- 116 ... programmable gain amplifier
- 118 ... A/D converter
- 120 ... microcontroller
- 122 ... application specific integrated circuit (ASIC)
- 124 ... DRAM working memory
- 125 ... album storage section
- 126 ... base camera flash memory
- 127 ... film mode image storage section
- 128 ... read only memory (ROM)
- 130 ... memory card interface connector
- 132 ... LCD interface drive circuitry
- 134 ... standard communications interface circuit
- 136 ... data communications port
- 140 ... microcontroller
- 142 ... magnetics I/O
- 144 ... motor drivers
- 150 ... LCD power module
- 152 ... analog subsystem module
- 154 ... main power module
- 156 ... LCD backlight power module
- 158 ... digital subsystem power module
- 160 ... lash charger and control module
- 162 ... a flash capacitor
- 164 ... flashtube
- 200 ... icon group
- 202 ... image display area
- 204 ... a scroll bar
- 206 ... function name display area
- 208 ... function data entry area
- 210 ... copy number icon
- 212 ... image format icon
- 214 ... title icon
- 216 ... album icon
- 218 ... magnification icon
- 220 ... mask
- 222 ... slide show icon
- 224 ... utilities icon
- 226 ... help icon
- 228 ... delete icon
- 232 ... host computer
- 233 ... communications link
- 234 ... remote computer
- 236 ... monitor
- 238 ... digital viewfinder image

What is claimed is:

1. A camera comprising:

a user activated shutter control;

a digital imaging device adapted to generate a digital image representative of a subject scene in response to activation of the shutter control;

a first memory for receiving and storing a last digital image of a plurality of digital images generated by the digital imaging device as a working image;

a second non-volatile memory for storing the plurality of digital images generated by the digital imaging device;

a display screen;

a control processor adapted to control an operation of the digital imaging device, the first memory, the second non-volatile memory and the display screen, and controlling first and second display modes; and camera operator controls for selecting at least said first or second display modes;

wherein the control processor, in the first display mode, accesses the first memory and transfers the last digital image to the display screen for display;

wherein the control processor, in the second display mode, accesses a plurality of images from the second non-volatile memory and transfers the images to the display screen for display; and wherein, in the first display mode, the control processor activates the display screen for a predetermined time period to display the image in the fixed memory, and then deactivates the display screen while continuing to enable the activation of the shutter control to generate a subsequent digital image.

2. A camera as claimed in claim 1, wherein the control processor in the second display mode automatically accesses and displays a plurality of digital images, and wherein each subsequent one of the plurality of digital images replaces the preceding one of the plurality of digital images and is displayed for a fixed period of time.

3. A camera as claimed in claim 1, further comprising photographic imaging device for imaging the subject scene onto a photographic film plane of the camera under control of the control processor.

4. A camera as claimed in claim 3, wherein the control processor further includes a camera operator interface that includes an image mode selector for selecting one of a film imaging mode, a hybrid imaging mode and the digital imaging mode of operation.

5. A camera as claimed in claim 4, wherein the photographic imaging device images the subject scene onto the photographic image plane in the film imaging mode and the hybrid imaging mode to generate a corresponding photographic film image on a photographic film located at the photographic imaging plane that corresponds with the digital image generated by the digital imaging device.

6. A camera as claimed in claim 5, wherein the digital imaging device generates a plurality of digital images under control of the control processor, and wherein each subsequent one of the plurality of digital images replaces a preceding one of the plurality of digital images as the image stored in the first memory, whereby the image stored in the first memory is representative of the last subject scene imaged by the camera.

7. A camera as claimed in claim 5, wherein the control processor further generates a film mode digital image in the film imaging mode of operation and stores the film mode digital image in a third internal fixed base camera memory of the camera.

8. A camera as claimed in claim 5, further comprising a removable interface connection device for receiving a removable memory device; wherein the second non-volatile memory is comprised in a removable memory card coupled to the interface connection device.

9. A camera as claimed in claim 8, wherein the control processor generates a hybrid mode digital image in the hybrid mode of operation and transfers the hybrid mode digital image to the removable memory interface connection means for storage on the memory card.

10. A camera as claimed in claim 9, wherein the camera operator control includes a first control for selecting the first display mode, and a second control for selecting film images or hybrid images in the second display mode.

11. A camera as claimed in claim 1, wherein the digital imaging device generates a plurality of digital images under control of the control processor, and wherein each subsequent one of the plurality of digital images replaces a preceding one of the plurality of digital images as the image stored in the first memory, whereby the image stored in the first memory is representative of the last subject scene imaged by the camera.

12. A camera as claimed in claim 4, wherein the camera operator control includes a quick review switch, and wherein the control processor activates the display screen to display the image stored in the first memory only when the quick review switch is activated.

13. A camera as claimed in claim 1, wherein images stored in the first memory are uncompressed and images stored in the second non-volatile memory are compressed.

14. A camera comprising:

an electronic image sensor;

an optical system positioned to project an imaged scene onto the electronic image sensor;

a user-activated shutter control;

a fixed memory coupled to an output of the electronic image sensor, wherein said fixed memory receives and stores a digital image generated by the electronic image sensor in response to an exposure signal;

a removable non-volatile memory for storing a plurality of digital images;

a display screen;

a control processor coupled to the display screen, the electronic image sensor, the fixed memory, (and) the removable non-volatile memory, and a user-activated shutter control;

a first power module for supplying power to at least the display screen, wherein the control processor generated a compressed digital image from the image from the electronic image sensor and transfers the compressed digital image to the removable non-volatile memory while retaining the last image in the fixed memory until a subsequent digital image is generated by the electronic image sensor in response to a subsequent exposure signal;

wherein the control processor generates a quick review image from the image stored in the fixed memory and supplies the quick review image to the display screen for display in response to an operation interface first display mode control;

wherein the control processor generates a sequence of digital images from the plurality of compressed digital images stored in the removable non-volatile memory and supplies the images to the display screen for display in response to an operator interface second display mode control; and wherein the second power module is activated to supply power to the display screen for a predetermined time period after the first display mode control is activated, and after said predetermined time period, the second power module is deactivated in order to deactivate the display screen while the first power module continues to supply power to at least the control processor and continues to enable the activation of the shutter control to generate a subsequent digital image.

15. A camera as claimed in claim 14, wherein the optical system further comprises a silver-halide optical system for selectively exposing a film plane of a photographic film transport unit of the camera to the imaged scene in response to the exposure signal.

16. A camera as claimed in claim 15, wherein the operator interface further includes an exposure switch for generating the exposure signal ; and wherein the operator interface further includes an image mode selector for selecting one of a film imaging mode, a hybrid imaging mode and a digital imaging mode of operation.

17. A camera as claimed in claim 16, wherein the control processor controls the operation of the silver-halide optical system in the film imaging mode and the hybrid imaging mode to expose the film plane to the imaged scene.

18. A camera as claimed in claim 16, wherein the control processor generates a film mode digital image in the film imaging mode of operation and stores the film mode digital image in an internal fixed base camera memory of the camera.

19. A camera as claimed in claim 16, wherein the control processor activates the display screen to display the quick review image as long as the first display mode control is activated.

20. A camera as claimed in claim 14, wherein the display screen comprises an LCD and an LCD backlight, said second power module controlling the LCD backlight for the LCD.

21. A camera comprising:

an optical viewfinder adapted to compose an image representative of a subject scene;

a user activated shutter control;

a digital imaging device adapted to generate a digital image representative of the subject scene in response to activation of the shutter control;

a first memory for receiving and storing a last digital image of a plurality of digital images generated by the digital imaging device as a working image;

a second non-volatile memory for storing the plurality of digital images generated by the digital imaging device;

a display screen;

a control processor adapted to control an operation of the digital imaging device, the first memory, the second non-volatile memory and the display screen, and controlling first and second display modes; and camera operator controls for selecting at least said first or second display modes;

wherein the control processor, in the first display mode, accesses the first memory and transfers the last digital image to the display screen for display;

wherein the control processor, in the second display mode, accesses a plurality of images from the second non-volatile memory and transfers the images to the display screen for display; and wherein the control processor deactivates the display screen while a user composes the image using the optical viewfinder, activates the screen for a predetermined time period to display the captured image, and then deactivates the display screen at the end of the predetermined time period while continuing to enable the activation of the shutter control to generate a subsequent digital image.

\* \* \* \* \*